US011863301B2

(12) United States Patent
Tanizawa et al.

(10) Patent No.: US 11,863,301 B2
(45) Date of Patent: Jan. 2, 2024

(54) SIGNAL PROCESSING DEVICE

(71) Applicant: Tamagawa Academy & University, Tokyo (JP)

(72) Inventors: Ken Tanizawa, Tokyo (JP); Fumio Futami, Tokyo (JP)

(73) Assignee: Tamagawa Academy & University, Tokyo (JP)

( * ) Notice: Subject to any disclaimer, the term of this patent is extended or adjusted under 35 U.S.C. 154(b) by 664 days.

(21) Appl. No.: 17/052,780

(22) PCT Filed: Mar. 15, 2019

(86) PCT No.: PCT/JP2019/010997
§ 371 (c)(1),
(2) Date: Nov. 3, 2020

(87) PCT Pub. No.: WO2019/216025
PCT Pub. Date: Nov. 14, 2019

(65) Prior Publication Data
US 2021/0242957 A1    Aug. 5, 2021

(30) Foreign Application Priority Data
May 10, 2018    (JP) .................. 2018-091536

(51) Int. Cl.
*H04K 1/02*    (2006.01)
*H04B 10/40*    (2013.01)
(Continued)

(52) U.S. Cl.
CPC ............... *H04K 1/02* (2013.01); *H04B 10/40* (2013.01); *H04B 10/548* (2013.01); *H04B 10/70* (2013.01); *H04B 10/85* (2013.01)

(58) Field of Classification Search
CPC ........ H04K 1/02; H04B 10/40; H04B 10/548; H04B 10/70; H04B 10/85
(Continued)

(56) References Cited

U.S. PATENT DOCUMENTS

2008/0019460 A1    1/2008  Giles et al.
2012/0213531 A1*   8/2012  Nazarathy ................. G02F 7/00
                                                                 398/202
(Continued)

FOREIGN PATENT DOCUMENTS

JP    2009-545207 A    12/2009
JP       5170586 B2     3/2013
(Continued)

OTHER PUBLICATIONS

International Search Report issued in PCT/JP2019/010997; dated Jun. 18, 2019.

*Primary Examiner* — Arnold M Kinkead
(74) *Attorney, Agent, or Firm* — Studebaker & Brackett PC

(57) ABSTRACT

The purpose of the present invention is to improve signal modulation resolution. A coarse phase modulation element 62A modulates a signal into any of M1 (M1 is an arbitrary integer) patterns in a first range. Fine phase modulation elements 62B-1 through 62B-(k−1) respectively modulate the signal into any of M2 through Mk (M2 through Mk are arbitrary integers that are independent of each other and M1) patterns in a second range through k-th range (k is an integer of 2 or greater). A coarse DAC 61A and DACs 61B-1 through 61B-(k−1) perform control such that the second range through k-th range become narrower than the first range.

4 Claims, 16 Drawing Sheets

(51) Int. Cl.
  *H04B 10/548* (2013.01)
  *H04B 10/70* (2013.01)
  *H04B 10/85* (2013.01)

(58) Field of Classification Search
  USPC ......... 380/256, 255; 398/155, 202; 375/329, 375/353; 332/103
  See application file for complete search history.

(56) References Cited

U.S. PATENT DOCUMENTS

2012/0281988 A1  11/2012  Kikuchi
2012/0328100 A1  12/2012  Hirota

FOREIGN PATENT DOCUMENTS

JP   2016-116121 A   6/2016
WO   2008/010935 A2  1/2008
WO   2011/083575 A1  7/2011

\* cited by examiner

SIGNAL PROCESSING DEVICE

TECHNICAL FIELD

The present invention relates to a signal processing device.

BACKGROUND ART

In recent years, the importance of security countermeasures has been increasing in the communication of information. A network system that makes up the Internet is described by the OSI reference model, which has been formulated by the International Organization for Standardization. The OSI reference model is split into seven layers, from the layer 1 physical layer to the layer 7 application layer. The interfaces that connect respective layers are either de facto standardized or are standardized through a standards body. The lowest layer from among the seven layers is the physical layer which is responsible for actual transmission and reception of signals by wire or wirelessly. Presently, security (which relies on mathematical ciphers in many cases) is implemented at layer 2 and above. Security countermeasures are not performed in the physical layer. However, there is the risk of eavesdropping in the physical layer. For example, in optical fiber communication which is representative of wired communication, it is possible in principle to introduce a branch into an optical fiber, and extract some of the signal power to thereby steal large amounts of information in one occasion. Accordingly, the present applicant is developing a certain protocol given in Patent Document 1, for example, as an encryption technique for the physical layer.

Patent Document 1: Japanese Patent No. 5170586

DISCLOSURE OF THE INVENTION

Problems to be Solved by the Invention

Improving modulation resolution is required as a countermeasure for eavesdropping in the physical layer, but it is difficult to sufficiently meet this requirement by simply applying the protocol described in Patent Document 1.

The present invention has been made in light of such a situation, and an object of the present invention is to improve modulation resolution.

Means for Solving the Problems

To achieve the above object, a signal processing device that is an embodiment of the present invention comprises: a first modulation element that modulates a signal to any one of M1 (M1 is an arbitrary integer) patterns in a first range; (k−1) (k is an integer that is greater than or equal to 2) second modulation elements that respectively modulate the signal to any one of M2 through Mk (M2 through Mk are arbitrary integers that are mutually independent of each other and M1) respective patterns in a second range through a kth range, respectively; and a control unit that controls the first range for the first modulation element and the respective second range through the kth range for the (k−1) second modulation elements, wherein the control unit performs control to make the respective second range through the kth range for the (k−1) second modulation elements narrower than the first range for the first modulation element.

Effects of the Invention

By virtue of the present invention, it is possible to improve modulation resolution.

PREFERRED MODE FOR CARRYING OUT THE INVENTION

Description is given below regarding embodiments of the present invention.

Figure 1:
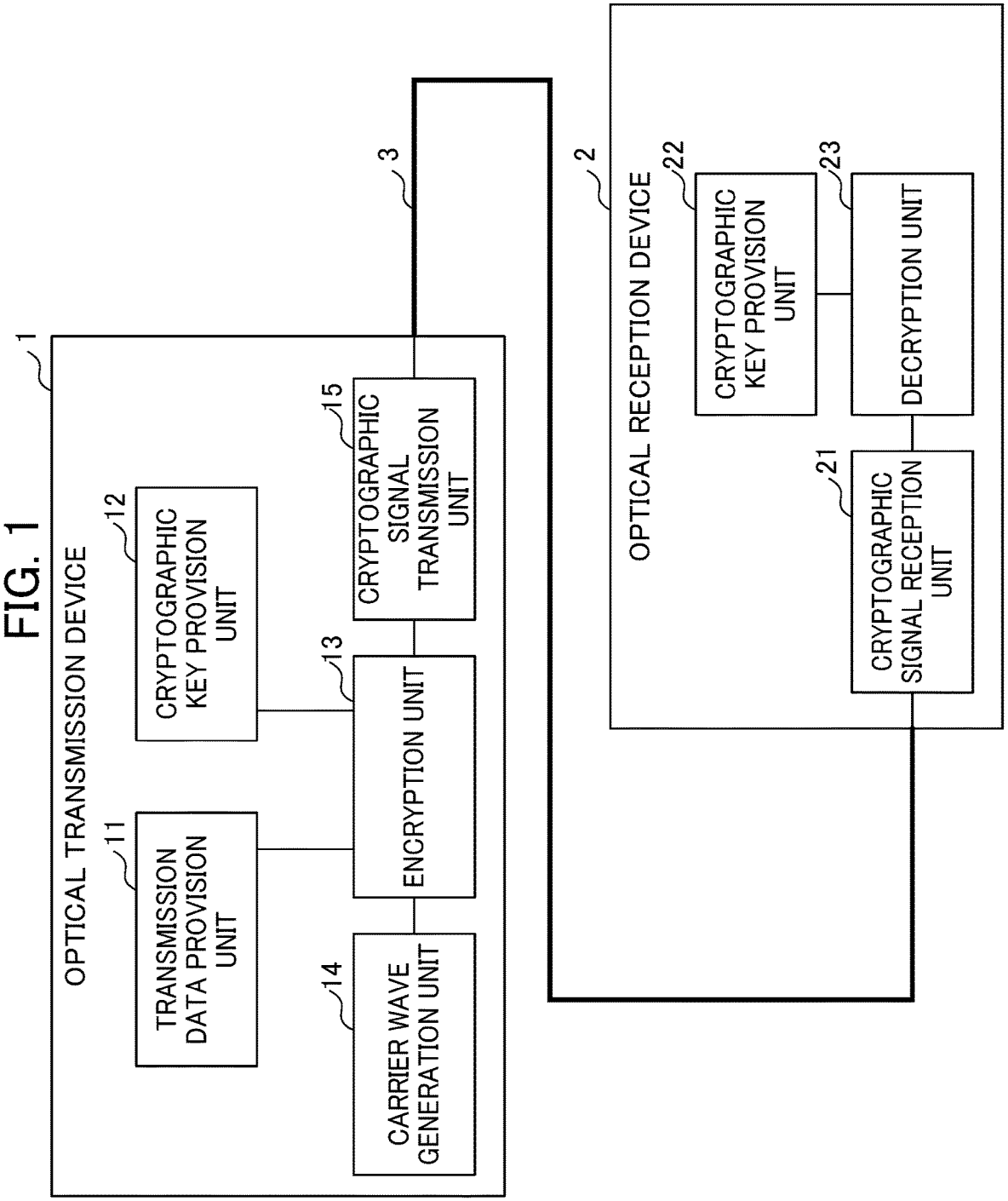
FIG. 1 is a block diagram that illustrates an example of a configuration of a transmission/reception system that includes an optical transmission device according to an embodiment of a signal processing device of the present invention.

FIG. 1 is a block diagram that illustrates an example of a configuration of a transmission/reception system that includes an optical transmission device according to an embodiment of a signal processing device of the present invention. The example of a transmission/reception system in FIG. 1 is configured so as to include an optical transmission device 1, an optical reception device 2, and an optical communication cable 3 for connecting these.

The optical transmission device 1 is configured so as to include a transmission data provision unit 11, a cryptographic key provision unit 12, an encryption unit 13, a carrier wave generation unit 14, and a cryptographic signal transmission unit 15.

The transmission data provision unit 11 generates plaintext data to be transmitted or receives plaintext data from a generation source (not illustrated), and provides the plaintext data to the encryption unit 13 as transmission data. The cryptographic key provision unit 12 provides the encryption unit 13 with a cryptographic key to use in encryption at the encryption unit 13. It is sufficient if the cryptographic key is a key that can be used in encryption and decryption by the optical transmission device 1 and the optical reception device 2, and there is no limitation in particular on the source of provision of the cryptographic key (place where the cryptographic key is generated or place where the cryptographic key is stored), the method of providing the cryptographic key, and methods of encryption and decryption. The encryption unit 13 uses the cryptographic key provided from the cryptographic key provision unit 12 to encrypt the transmission data provided from the transmission data provision unit 11, superimposes the encrypted transmission data on a carrier wave (optical signal) generated by the carrier wave generation unit 14 which is described later, and provides the result of the superimposition to the cryptographic signal transmission unit 15. The optical signal outputted from the encryption unit 13, in other words the result of superimposing the encrypted transmission data on a carrier wave, is referred to below as a "cryptographic signal". The carrier wave generation unit 14 generates a carrier wave as an optical signal, and provides the carrier wave to the encryption unit 13. The cryptographic signal transmission unit 15 transmits the cryptographic signal provided from the encryption unit 13 to the optical reception device 2 via the optical communication cable 3 after, for example, amplifying the cryptographic signal if necessary.

As described above, the cryptographic signal (optical signal) is outputted from the optical transmission device 1, transferred by the optical communication cable 3, and received by the optical reception device 2. The optical reception device 2 decrypts the received cryptographic signal to thereby cause the plaintext data (transmission data) to be restored. Accordingly, the optical reception device 2 is configured so as to include a cryptographic signal reception unit 21, a cryptographic key provision unit 22, and a decryption unit 23.

The cryptographic signal reception unit 21 receives the cryptographic signal (optical signal), converts the cryptographic signal to an electrical signal, and provides the electrical signal to the decryption unit 23. A result of converting a cryptographic signal (optical signal) to an electrical signal at the cryptographic signal reception unit 21 is referred to below as "cryptographic data". The cryptographic key provision unit 22 provides the decryption unit 23 with a cryptographic key that is used when decrypting cryptographic data. The decryption unit 23 uses the cryptographic key provided from the cryptographic key provision unit 22 to decrypt the cryptographic data provided from the cryptographic signal reception unit 21 and thereby restore the plaintext data (transmission data).

In this way, in the present embodiment, the cryptographic signal is employed as an example of an optical signal transferred by the optical communication cable 3. Accordingly, in the example of FIG. 1, optical fiber communication, which is representative of wired communication, is employed as a method of communicating the cryptographic signal. In optical fiber communication, a third party can in principle introduce a branch into an optical fiber and extract some of the signal power to thereby steal large amounts of information (the cryptographic signal here) in one occasion. Accordingly, it is necessary to have a technique such that the meaning and content of the cryptographic signal, in other words the content of the plaintext (transmission data), cannot be recognized by a third party, even if the cryptographic signal is intercepted. As such as method, the applicant is developing a technique that uses the Y-00 optical communication quantum cipher.

Figure 2:
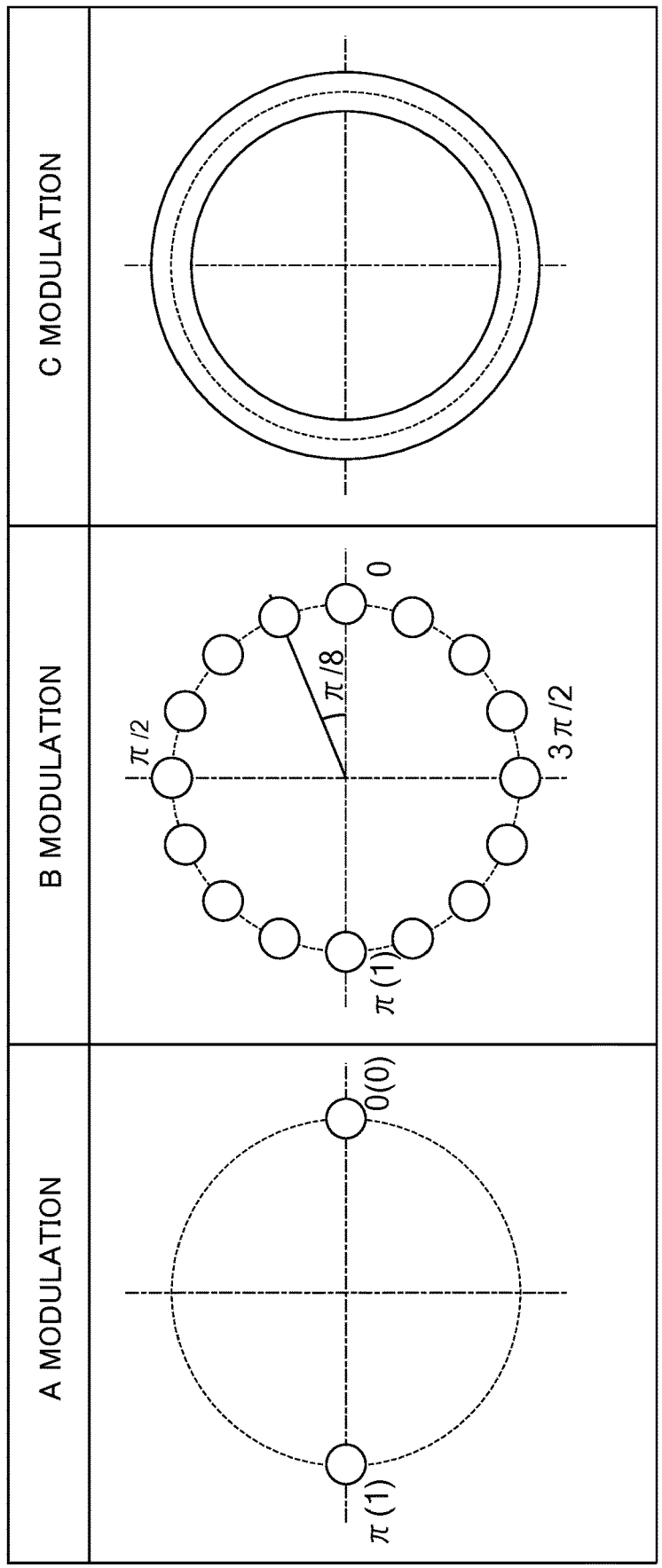
FIG. 2 is a view for describing an overview of principles of the Y-00 optical communication quantum cipher applied to the optical transmission device of FIG. 1.
Figure 3:
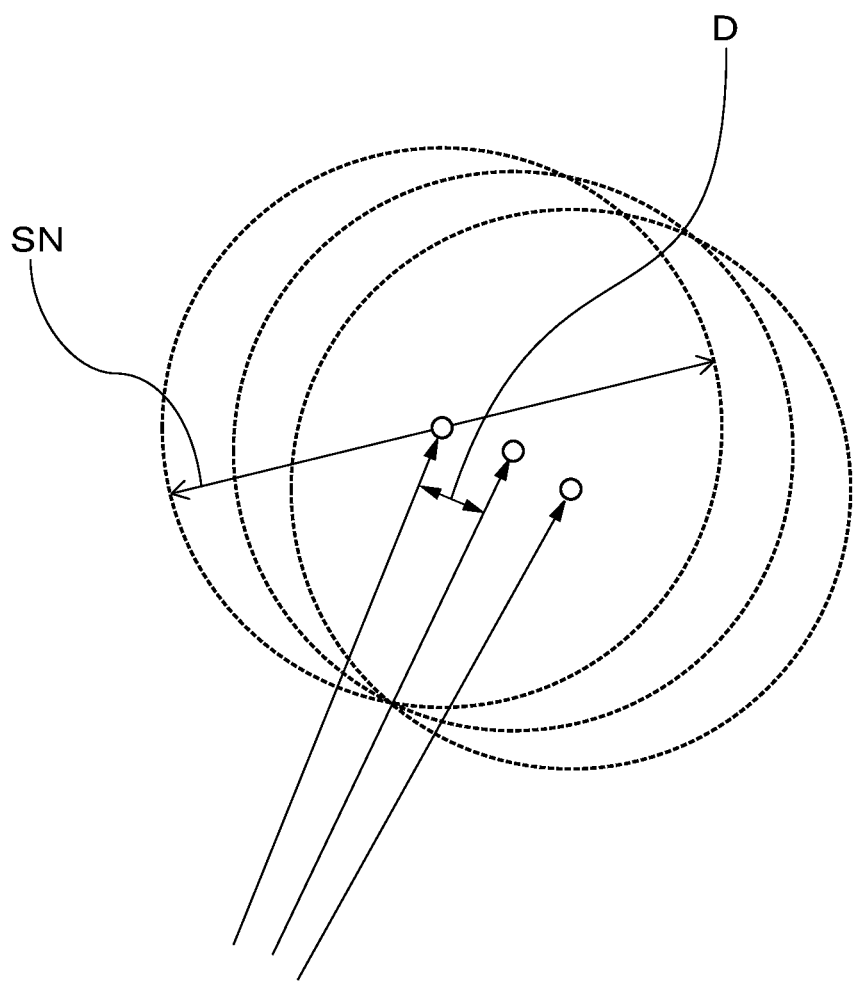
FIG. 3 is a view that expands FIG. 2 in order to enable visual recognition of the arrangement of three adjacent symbol points from among the arrangement of N=4096 symbol points in the phase modulation of FIG. 2.

The Y-00 optical communication quantum cipher has "not allowing an eavesdropper to correctly obtain ciphertext due to effects of quantum noise" as a feature, and was developed by the applicant. In the Y-00 optical communication quantum cipher, transmission data (plaintext) is represented by an aggregate of one or more items of bit data: "0" or "1". Each item of bit data that makes up the transmission data is modulated by a predetermined algorithm to a predetermined level from among N (N is an integer greater than or equal to 2) levels. The number N is referred to below as the "number of modulations N". In the Y-00 optical communication quantum cipher, encryption of transmission data (plaintext) is performed by modulating at least one of the phase or amplitude of an optical signal (carrier wave) by one of the number of modulations N of levels, in accordance with a cryptographic key present on the encrypting side and the decrypting side. By making the number of modulations N a very large number, the feature of "not allowing an eavesdropper to correctly obtain ciphertext due to effects of quantum noise" is realized. Regarding the "predetermined protocol" employed in the Y-00 optical communication quantum cipher, please refer to Japanese Patent No. 5170586, for example. With reference to FIG. 2 and FIG. 3, simple description is given regarding an overview of the principles of the Y-00 optical communication quantum cipher, taking phase modulation as an example.

FIG. 2 is a view for describing an overview of the principles of the Y-00 optical communication quantum cipher. The A modulation through C modulation shown in FIG. 2 illustrate IQ planes that represent the phase and amplitude (intensity) of an optical signal, with the intersection of the vertical axis and the horizontal axis as the origin. When a point on one of these IQ planes is determined, the phase and amplitude of the optical signal are uniquely determined. Taking the origin of the IQ plane as the start point, the phase is the angle formed between the line segment ending at the point representing the optical signal and the line segment representing phase 0. In contrast, the amplitude is the distance between the point representing the optical signal and the origin of the IQ plane.

The A modulation illustrated in FIG. 2 is to facilitate understanding of the Y-00 optical communication quantum cipher, and is a graph for describing the principles of normal two-level modulation. For example, if plaintext (transmission data) is superimposed as is on an optical signal (carrier wave) and transmitted, two-level modulation indicated as the A modulation illustrated in FIG. 2 will be performed on each item of bit data (1 or 0) that makes up the plaintext. In this case, in the A modulation illustrated in FIG. 2, the arrangement of a point (hereinafter, referred to as a "symbol point") indicating the optical signal after phase modulation when the bit data is "0" is the arrangement of a point given by 0(0) on the right side on the horizontal axis, in other words an arrangement where the phase is 0. In contrast, the arrangement of a symbol point when the bit data is 1 is the arrangement of π(1) on the left side on the horizontal axis, in other words an arrangement when the phase is n.

The B modulation illustrated in FIG. 2 is to describe principles of phase modulation when the number of modulations N=16, in a case where the Y-00 optical communication quantum cipher is employed. In the case of the example of B modulation illustrated in FIG. 2, a random level from among eight levels is generated by using the cryptographic key, for each item of bit data that makes up the plaintext. The phase modulation is performed by, for each bit, rotating the phase of the symbol point in the normal two-level modulation indicated as the A modulation illustrated in FIG. 2 (the point for phase 0 corresponding to 0 and the point for phase n corresponding to 1) in the IQ plane in accordance with a level from among the eight levels and is generated randomly. Because the value that bit data can take is binary—either "0" or "1", as a result, when the phase modulation of the example of B modulation illustrated in FIG. 2 is performed, the arrangement of the symbol points becomes an arrangement of 16 points (number of modulations N=16) for which the phase respectively differs by π/8.

However, in the case of the example of B modulation illustrated in FIG. 2, the value—"0" or "1"—that the bit data can take is merely modulated to one of the levels from among the number of modulations N=16 levels. Therefore, if the optical signal (cryptographic signal), which has the arrangement of 16 symbol points, is intercepted, there is the risk that the meaning of its content—in other words the content of the plaintext (transmission data)—will be recognized by a third party. In other words, the security of the Y-00 optical communication quantum cipher is not sufficient at only around the number of modulations N=16. Accordingly, in practice, as indicated by the C modulation illustrated in FIG. 2, a very large number, for example 4096, is employed as the number of modulations N, and the security of the Y-00 optical communication quantum cipher is improved.

The C modulation illustrated in FIG. 2 is to describe principles of phase modulation when the number of modulations N=4096, in a case where the Y-00 optical communication quantum cipher is employed. FIG. 3 is a view that expands the C modulation illustrated in FIG. 2 in order to enable visual recognition of the arrangement of three adjacent symbol points from among the arrangement of N=4096 symbol points in the phase modulation for the C modulation illustrated in FIG. 2. As illustrated in FIG. 3, for each symbol point, there is variation due to shot noise (quantum noise) in only a range SN. The shot noise is noise due to the quantum nature of light, is truly random, and has a characteristic of being one of the laws of physics that is not set aside. When phase modulation with a very large number, such as 4096, as the number of modulations N, is performed, adjacent symbol points cannot be discriminated from one another because they are obscured by shot noise, as illustrated in FIG. 3. Specifically, when the distance D between two adjacent symbol points is sufficiently smaller than the range SN of shot noise (when phase modulation with a very large number as the number of modulations N is performed so as to make the distance D this small), it is difficult to determine the position of the original symbol points from phase information measured at a receiving side. In other words, for example, the phase of an optical signal at a certain time corresponds to the position of a central symbol point of the three symbol points illustrated in FIG. 3. In such a case, it not possible to distinguish whether this central symbol point is something transmitted as an optical signal for a symbol point that was originally at the central position, or whether this was actually something transmitted as an optical signal for a neighboring symbol point but was measured at the central position under the effect of shot noise.

To summarize the above, modulation where the number of modulations N is very large is employed in the Y-00 optical communication quantum cipher. Although the modulation is phase modulation in the example of FIG. 2 and FIG. 3, the modulation may be amplitude (intensity) modulation instead of or in addition to phase modulation. In other words, optical signal modulation using the Y-00 protocol can employ any modulation method such as intensity modulation, amplitude modulation, phase modulation, frequency modulation, and quadrature amplitude modulation. By this, it becomes possible to make the distance D between two symbol points sufficiently smaller than the range SN of shot noise, and the feature "not allowing an eavesdropper to correctly obtain ciphertext due to effects of quantum noise" becomes possible. In addition, although quantum noise ensures security, in practice an eavesdropper is prevented from obtaining the correct ciphertext due to the effect of all noise, including classical noise such as thermal noise in addition to quantum noise. In other words, it can be said that the security of the Y-00 optical communication quantum cipher relates to how large the number of modulations N can be set to.

With reference to several concrete examples in which the Y-00 optical communication quantum cipher is employed, description is given separately for detailed configurations of the encryption unit 13 of the optical transmission device 1 of FIG. 1. Firstly, in order to facilitate understanding of the present invention, description is given separately for two concrete examples of the basic encryption unit 13, with reference to FIG. 4 and FIG. 5. In the description of the basic encryption unit 13, it is assumed that phase modulation with the number of modulations N=4096 is performed for the convenience of the description.

Figure 4:
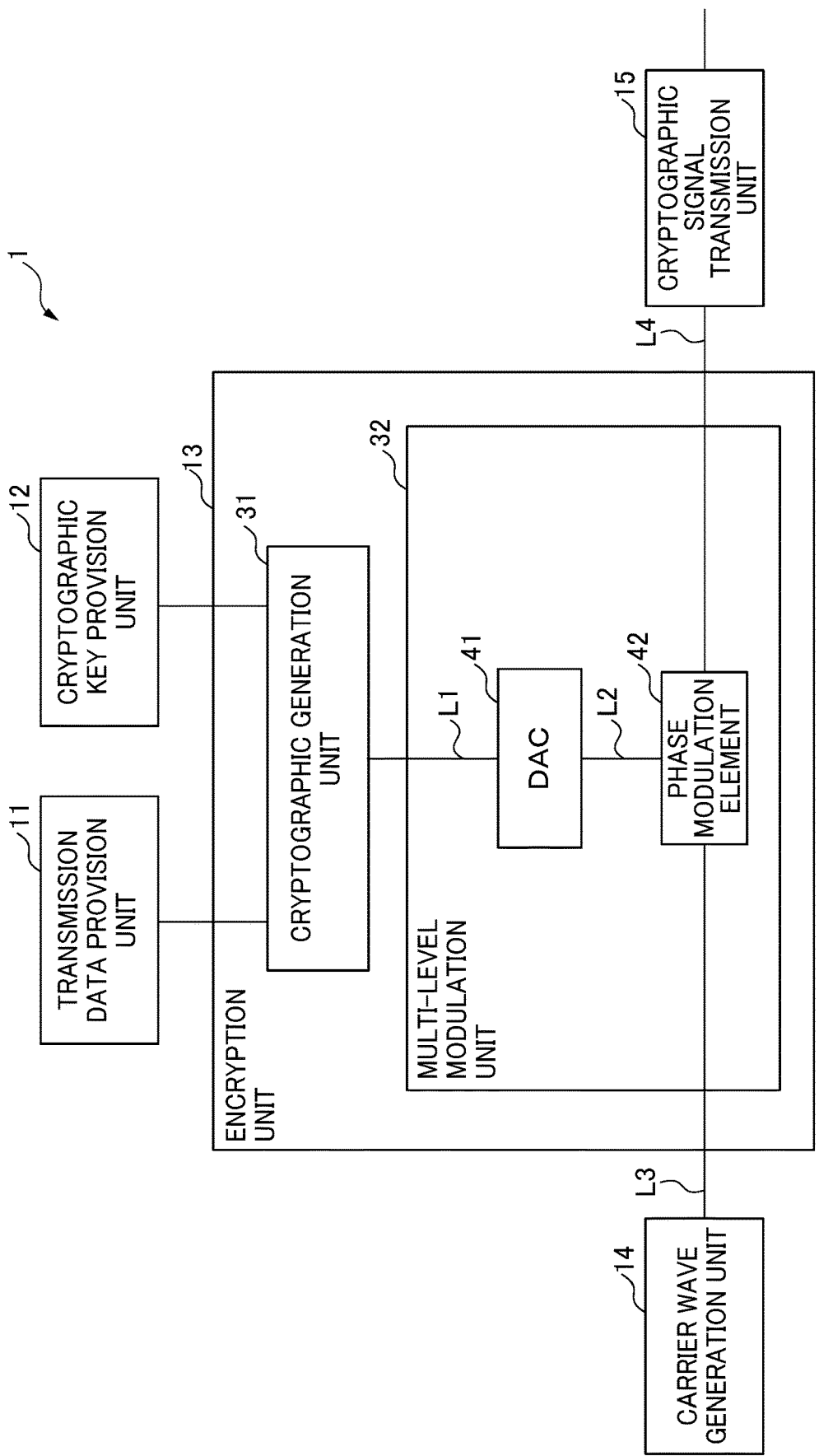
FIG. 4 is a block diagram illustrating an example of a detailed configuration of a basic encryption unit in the optical transmission device 1 of FIG. 1.

FIG. 4 is a block diagram illustrating an example of a detailed configuration of the basic encryption unit 13 in the optical transmission device 1 of FIG. 1.

The basic encryption unit 13 of the example of FIG. 4 is provided with a cryptographic generation unit 31 and a multi-level modulation unit 32. The cryptographic generation unit 31 of the example of FIG. 4 encrypts the transmission data by using a cryptographic key provided from the cryptographic key provision unit 12 to convert each item of bit data (0 or 1) that makes up the transmission data provided from the transmission data provision unit 11 into data (hereinafter referred to as "multi-level data") having an arbitrary level from among the multiple levels for the number of modulations N=4096. In other words, the cryptographic generation unit 31 generates multi-level data for each item of bit data that makes up the transmission data, and, via a signal path L1, supplies the multi-level data to the multi-level modulation unit 32 as a digital signal.

The multi-level modulation unit 32 of the example of FIG. 4 is provided with a digital analog converter (hereinafter abbreviated as "DAC") 41 and a phase modulation element 42.

The DAC 41 obtains, via the signal path L1, multi-level data corresponding to each item of bit data supplied from the cryptographic generation unit 31. The DAC 41 converts the multi-level data (digital signal) into an analog voltage (hereinafter referred to as a "multi-level voltage") having a level from among multiple levels, and applies the multi-level voltage to the phase modulation element 42 via the signal path L2.

The phase modulation element 42 is, via a signal path L3, inputted with an optical signal generated as a carrier wave in the carrier wave generation unit 14. The phase modulation element 42 causes the phase of this optical signal to rotate (modulates the phase) in accordance with the multi-level voltage that is from the DAC 41 via a signal path L2 and is applied for each item of bit data, and supplies results of the rotation to the cryptographic signal transmission unit 15 via a signal path L4.

Figure 5:
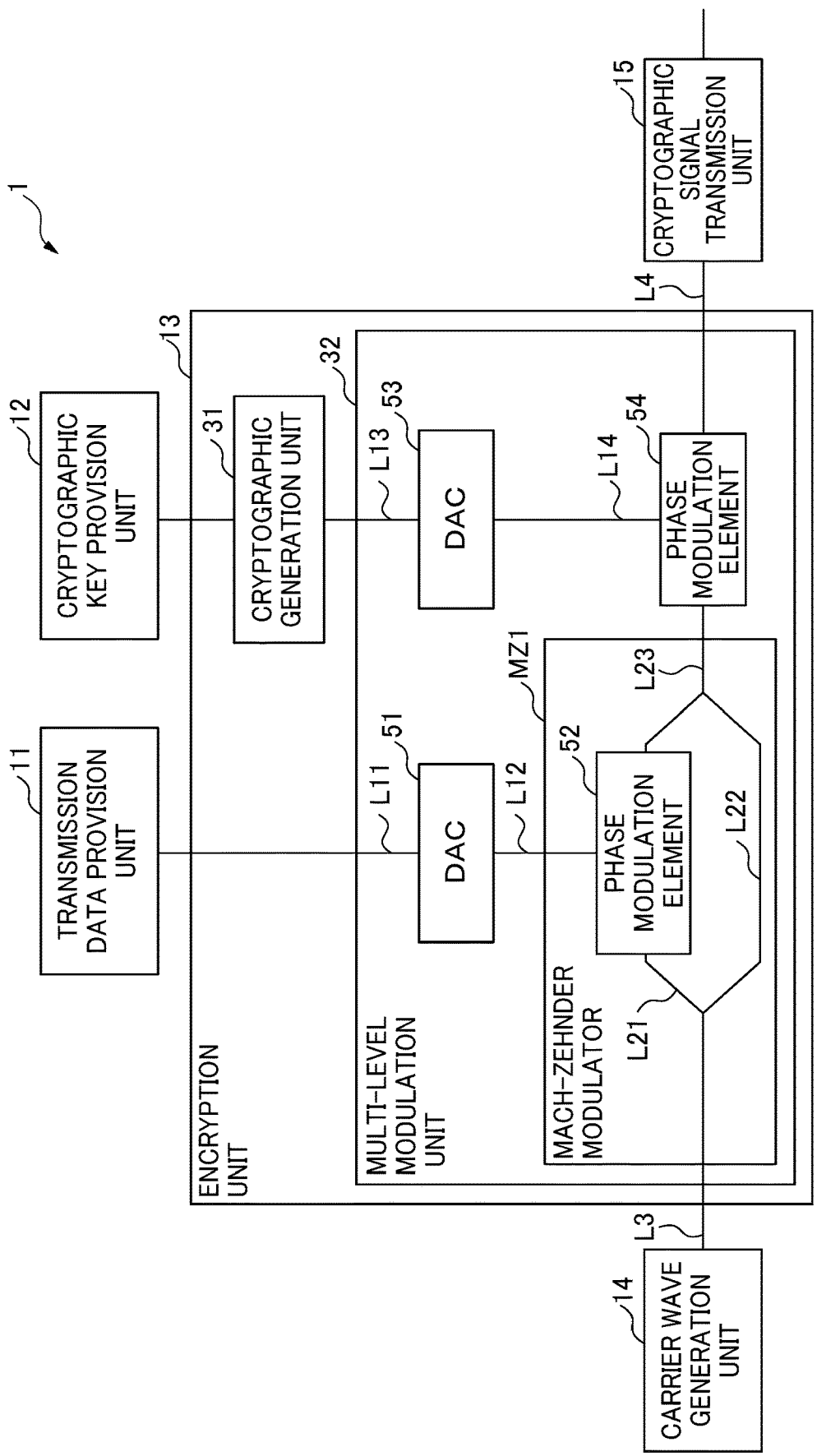
FIG. 5 is a block diagram illustrating an example, different to that of FIG. 4, of a detailed configuration of a basic encryption unit in the optical transmission device 1 of FIG. 1.

FIG. 5 is a block diagram illustrating an example, different to that of FIG. 4, of a detailed configuration of the basic encryption unit 13 in the optical transmission device 1 of FIG. 1. The basic encryption unit 13 of the example of FIG. 5 is provided with the cryptographic generation unit 31 and the multi-level modulation unit 32.

The cryptographic generation unit 31 of the example of FIG. 5 uses a cryptographic key provided from the cryptographic key provision unit 12 to generate multi-level (2048 levels) data. Here, the reason why the levels that a piece of multi-level data can take is 2048, which is half the number of modulations N=4096, will be described later in the description of the multi-level modulation unit 32.

The multi-level modulation unit 32 of the example of FIG. 5 is provided with a DAC 51 and a Mach-Zehnder modulator MZ1 that includes a phase modulation element 52. Here, the Mach-Zehnder modulator MZ1 is a modulator that uses the principles of a Mach-Zehnder interferometer. The signal path L3 branches into a signal path L21 and a signal path L22. A phase modulation element 52 is arranged on the signal path L21. By this, an optical signal that passes along the signal path L21 via the phase modulation element 52 and an optical signal that passes along the signal path L22 mutually interfere, and a result of this interference is outputted from a signal path L23. Note that the Mach-Zehnder modulator MZ1 of the configuration of FIG. 5 is merely an example. That is, by interposing a phase modulation element on one or both of the branched signal paths, it is possible to use a Mach-Zehnder interferometer as the Mach-Zehnder modulator MZ1.

The DAC 51 converts the transmission data supplied from the transmission data provision unit 11 into a binary voltage (analog signal) for each item of bit data, and applies the binary voltage to the phase modulation element 52 via a signal path L12.

The phase modulation element 52 is inputted with an optical signal (carrier wave) that is generated at the carrier wave generation unit 14 and transmitted on the signal path L21. The phase modulation element 52 causes the phase of the optical signal to rotate in accordance with the binary voltage that is from the DAC 51 via the signal path L12 and is applied for each item of bit data (performs phase modulation), and outputs results of the rotation. The optical signal outputted from the phase modulation element 52 interferes with the optical signal (carrier wave) that is generated in the carrier wave generation unit 14 and transmitted on the signal path L22, and the result is the normal two-level phase modulation signal indicating the A modulation illustrated in FIG. 2. A number of modulations N1=2 for this two-level modulation. The two-level modulation signal is supplied to a phase modulation element 54 via the signal path L23.

A DAC 53 obtains, via a signal path L13, multi-level (2048 levels) data supplied from the cryptographic generation unit 31. The DAC 53 converts the multi-level data to a multi-level (2048 levels) voltage, and applies the multi-level voltage to the phase modulation element 54 via a signal path L14.

The phase modulation element 54 is inputted with an optical signal from the Mach-Zehnder modulator MZ1, via the signal path L23. The phase modulation element 54 causes the phase of this optical signal to rotate in accordance with the multi-level (2048 levels) voltage that is from the DAC 53 via the signal path L14 and is applied for each item of bit data (modulates the phase), and supplies results of the rotation to the cryptographic signal transmission unit 15 via the signal path L4. Here, the optical signal supplied to the phase modulation element 54 is subject to two-level modulation in the Mach-Zehnder modulator MZ1 as described above. In other words, the number of modulations N1 of the data modulation in the Mach-Zehnder modulator MZ1 is two. In addition, a number of modulations N2 in the phase modulation element 54 is 2048. Accordingly, the product of the number of modulations N1 and the number of modulations N2, in other words N1×N2=2×2048=4096, is the overall number of modulations N.

In this way, in the basic encryption unit 13 of the example of FIG. 5, the phase modulation (data phase modulation) with respect to the binary data that makes up the bit data is performed by the Mach-Zehnder modulator MZ1, whereas the phase modulation (phase rotation) for encryption is performed by the phase modulation element 54. In other words, in the example of FIG. 4, processing that uses the cryptographic key provided from the cryptographic key provision unit 12 to convert each item of the bit data (0 or 1) that makes up the transmission data provide from the transmission data provision unit 11 into data having an arbitrary level from among the multiple levels for the number of modulations N=4096, in other words multi-level data, is performed in the digital (electrical) domain, whereas this processing is performed in the optical domain in the example of FIG. 5.

Here, as the phase modulation element (the phase modulation element 42 in the example of FIG. 4, and the phase modulation elements 52 and 54 in the example of FIG. 5), it is possible to employ a high speed phase modulation element put into practical use when the present application was filed, specifically, for example, a lithium niobate (LiNbO$_3$) modulation element, an indium phosphide (InP) modulation element, a silicon p-n junction modulation element, or the like.

Incidentally, as described above, the number of modulations N is important to ensure the security of the Y-00 cipher. In a case where the basic encryption unit 13 of FIG. 4 and FIG. 5 described above is used, there will be limitations placed on the number of modulations N due to the output voltage resolution of the DAC (the DAC 41 in the example of FIG. 4, and the DACs 51 and 53 in the example of FIG. 5). More specifically, there is a strong trade-off between output voltage resolution and modulation bandwidth (speed), and DACs that can be obtained at present have 1024 levels for modulation at 10 Gbit/s. In other words, in a case where something put into practical use at present at the time of filing of the present application is employed as a DAC, when the basic encryption unit 13 of FIG. 4 and FIG. 5 described above is used, it is difficult to realize 4096 as the number of modulations N in modulation at 10 Gbit/s. Conversely, in a case where something put into practical use at present at the time of filing of the present application is employed, it will be necessary to decrease the transfer speed from 10 Gbit/s in order to achieve having 4096 as the number of modulations N. Furthermore, in order to further ensure high security, the number of modulations N is required to be approximately 10,000. It is not be possible at all to meet such a requirement with the basic encryption unit 13 of FIG. 4 and FIG. 5.

Accordingly, in order to meet such a requirement, the inventors conceived of a new technique as follows. That is, the inventors devised a technique of performing modulation (at least one of phase modulation and amplitude modulation) of light in k stages (k is an integer greater than or equal to 2), specifically, for example, a technique of decomposing the number of modulations N to have N=M1×M2× . . . ×Mk, performing a first type of optical modulation once with the number of modulations M1, and subsequently performing a second type of optical modulation (k−1) times corresponding to the number of modulations M2 through Mk. The first type of modulation is referred to below as "coarse modulation" and the second type of modulation is referred to below as "fine modulation". Accordingly, with reference to the drawings of FIG. 6 and thereafter, description is given below for several concrete examples in relation to applying this new technique to the basic encryption unit 13 of FIG. 4 or FIG. 5 described above.

Figure 6:
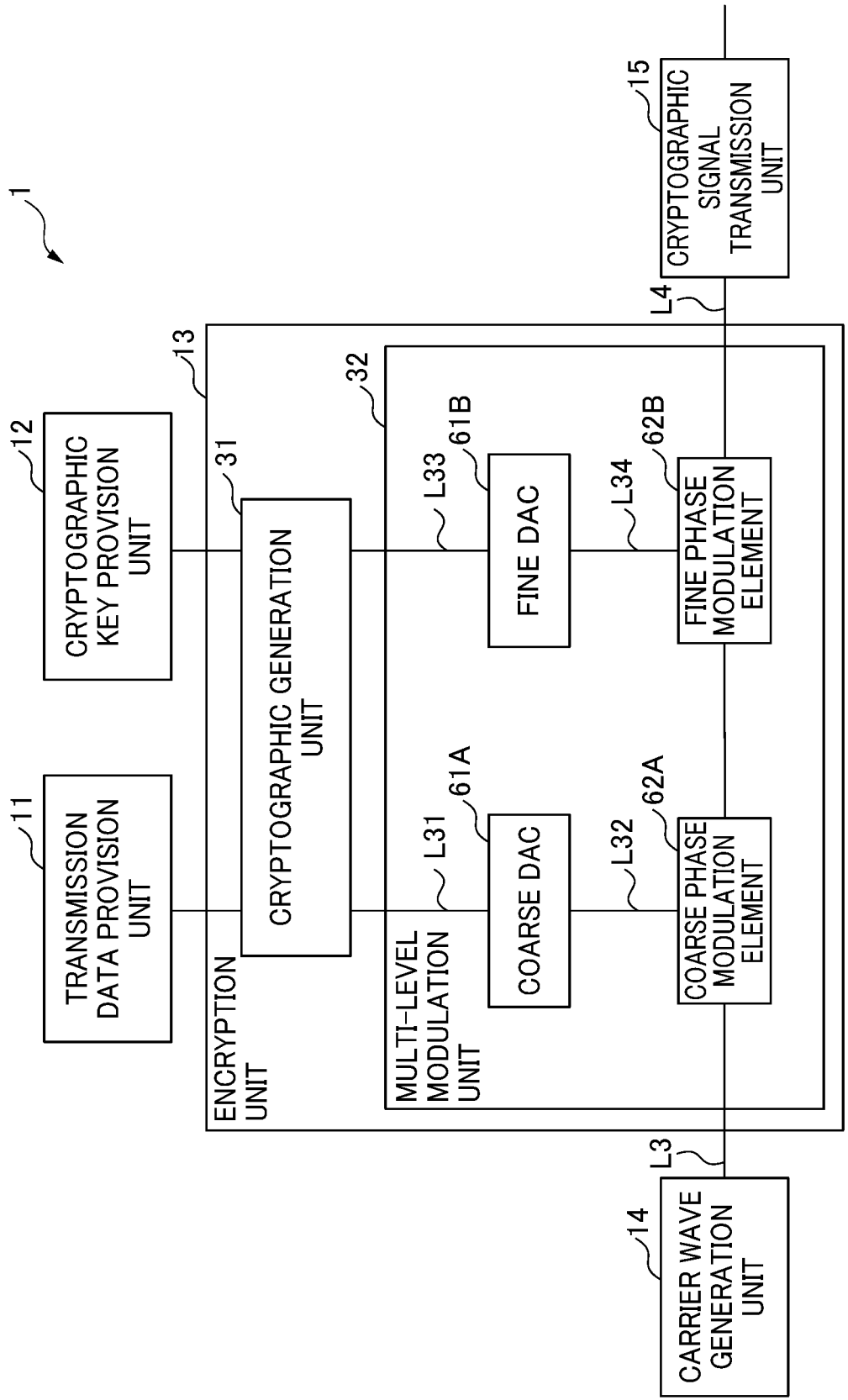
FIG. 6 is a block diagram illustrating an example of a detailed configuration of an encryption unit resulting from applying a new technique to the basic encryption unit of FIG. 4, in other words a first example of an encryption unit in which the present invention is applied.

FIG. 6 is a block diagram illustrating an example of a detailed configuration of an encryption unit resulting from applying a new technique to the basic encryption unit of FIG. 4 described above, in other words a first example of an encryption unit in which the present invention is applied.

In order to facilitate understanding of the present invention, phase modulation where there are k=2 stages is performed in the example of FIG. 6. In other words, in the example of FIG. 6, coarse modulation with the number of modulations M1 and fine modulation with the number of modulations M2 are performed, so that modulation with the overall number of modulations N=M1×M2 is performed.

The encryption unit 13 of the example of FIG. 6 is provided with the cryptographic generation unit 31 and the multi-level modulation unit 32. The cryptographic generation unit 31 of the example of FIG. 6 has an essentially similar function to that of the cryptographic generation unit 31 of the example of FIG. 4. However, the manner of output by the cryptographic generation unit 31 of the example of FIG. 6 differs in comparison to the cryptographic generation unit 31 of the example of FIG. 4 as follows. In other words, from the cryptographic generation unit 31 of the example of FIG. 4, multi-level (N levels) data corresponding to the number of modulations N is outputted to the signal path L1. In contrast to this, from the cryptographic generation unit 31 of the example of FIG. 6, multi-level (M1 levels) data (hereinafter referred to as "coarse multi-level data") corresponding to the number of modulations M1 for coarse modulation is outputted to a signal path L31, and multi-level (M2 levels) data (hereinafter referred to as "fine multi-level data") corresponding to the number of modulations M2 for fine modulation is outputted to a signal path L33.

The multi-level modulation unit 32 of the example of FIG. 6 is provided with a coarse DAC 61A, a fine DAC 61B, a coarse phase modulation element 62A, and a fine phase modulation element 62B.

The coarse DAC 61A obtains, via the signal path L31, coarse multi-level data corresponding to each item of bit data supplied from the cryptographic generation unit 31. The coarse DAC 61A converts the coarse multi-level data (a digital signal) to a multi-level voltage (an analog signal), and applies the multi-level voltage to the coarse phase modulation element 62A via a signal path L32. Note that the voltage outputted from the coarse DAC 61A is referred to below as a "coarse multi-level voltage".

The coarse phase modulation element 62A is, via the signal path L3, inputted with an optical signal (carrier wave) generated in the carrier wave generation unit 14. The coarse phase modulation element 62A causes the phase of the optical signal to rotate (modulates the phase) in accordance with the coarse multi-level voltage applied for each item of bit data from the coarse DAC 61A via the signal path L32, and supplies the results of the rotation to the fine phase modulation element 62B. In other words, the optical signal to which the coarse modulation with the number of modulations M1 has been performed is supplied to the fine phase modulation element 62B.

The fine DAC 61B obtains, via the signal path L33, fine multi-level data corresponding to each item of bit data supplied from the cryptographic generation unit 31. The fine DAC 61B converts the fine multi-level data (a digital signal) to a multi-level voltage (an analog signal), and applies the multi-level voltage to the fine phase modulation element 62B via a signal path L34. Note that the voltage outputted from the fine DAC 61B is referred to below as a "fine multi-level voltage".

The fine phase modulation element 62B is inputted with the optical signal outputted from the coarse phase modulation element 62A, in other words the optical signal to which the coarse modulation with the number of modulations M1 has been performed. The fine phase modulation element 62B causes the phase of this optical signal to rotate in accordance with the fine multi-level voltage that is from the fine DAC 61B via the signal path L34 and is applied for each item of bit data (modulates the phase), and supplies results of the rotation to the cryptographic signal transmission unit 15 via the signal path L4. In other words, the optical signal to which the coarse modulation with the number of modulations M1 has already been performed also undergoes fine modulation with the number of modulations M2 by the fine phase modulation element 62B, and, as a result, an optical signal to which modulation with the number of modulations N=M1×M2 has been performed is supplied to the cryptographic signal transmission unit 15 via the signal path L4.

Figure 7:
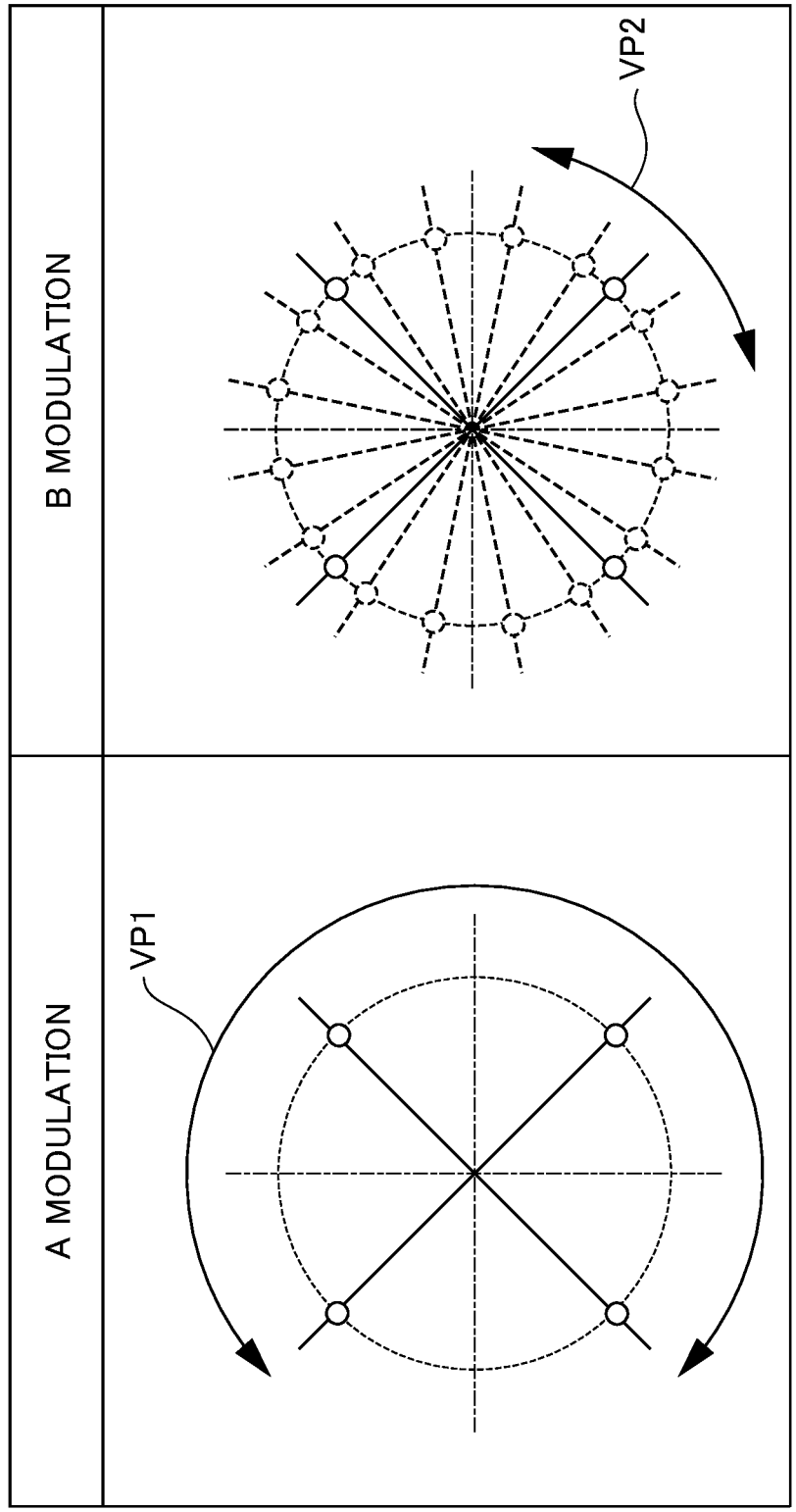
FIG. 7 is a view for describing respective principles of coarse phase modulation and fine phase modulation applied to the encryption unit of the example of FIG. 6.

FIG. 7 is a view for describing an overview of respective principles of coarse phase modulation and fine phase modulation applied to the encryption unit 13 of the example of FIG. 6. Note that, in the example of FIG. 6 described above, the number of coarse modulations M1 and the number of fine modulations M2 are determined so that the number of modulations N=4096. In contrast to this, for convenience of the description for FIG. 7, modulation is respectively performed with the number of coarse modulations M1=4 and the number of modulations M2=4 so that the number of modulations N=16.

The A modulation illustrated in FIG. 7 is to describe the principles of coarse phase modulation when the number of coarse modulations M1=4. It is assumed that the carrier wave (optical signal) generated in the carrier wave generation unit 14 is not modulated, and a reference phase angle is zero, for example. The coarse phase modulation element 62A causes the phase of the optical signal to rotate from zero to a phase corresponding to any one of the number of coarse modulations M1=4 symbol points (solid line white circles in the A modulation illustrated in FIG. 7). Which point from among the number of coarse modulations M1=4 symbol points (solid line white circles in the A modulation illustrated in FIG. 7) is rotated is based on the applied voltage. In the coarse phase modulation for the A modulation illustrated in FIG. 7, with the phase angle θ (the horizontal axis in the A modulation illustrated in FIG. 7) as a reference, the phase is rotated in a range VP1 (−3π/4 through 3π/4) in phase modulation where M1=4.

The B modulation illustrated in FIG. 7 is to describe the principles of fine phase modulation when the number of fine modulations M2=4. In fine phase modulation for the B modulation illustrated in FIG. 7, the optical signal which is to be modulated is already subject to phase modulation: coarse phase modulation where M1=4. Accordingly, the phase angle that is to be the reference is one of the four phases respectively corresponding to the arrangement positions of each symbol point indicated in the A modulation illustrated in FIG. 7, in other words −3π/4, −π/4, π/4, and 3π/4. The symbols corresponding to these reference phase angles are illustrated as solid line white circles in the B modulation illustrated in FIG. 7. The fine phase modulation element 62B causes the phase of the optical signal to rotate from the reference phase angle to a phase corresponding to any one of the number of fine modulations M2=4 symbol points (dotted line white circles in the B modulation illustrated in FIG. 7). In the fine phase modulation of the B modulation illustrated in FIG. 7, because there are four reference phase angles (the solid line white circles indicated in the B modulation illustrated in FIG. 7), in fine phase modulation with M2=4, the phase is rotated in a range VP2 between two reference phase angles, in other words ¼ of the range VP1 for the coarse phase modulation which is the A modulation illustrated in FIG. 7. In other words, assuming that the coarse phase modulation element 62A and the fine phase modulation element 62B have the same characteristics, it is necessary to set the voltage output of the fine DAC 61B to be ¼ of the voltage output of the coarse DAC 61A. By fine phase modulation being performed after coarse phase modulation in this way, phase modulation with N=16 (=M1×M2) becomes possible as a result.

If the characteristics (efficiency) of the coarse phase modulation element 62A and the fine phase modulation element 62B differ, it is necessary to consider the difference here. For example, assuming that the output voltage from the fine DAC 61B is the same as that of the coarse DAC 61A, by setting the efficiency of the fine phase modulation element 62B to be ¼ of that of the coarse phase modulation element 62A (for example, by setting an element length to be ¼), it is possible to achieve the coarse phase modulation indicated by the A modulation illustrated in FIG. 7 described above, and the fine phase modulation indicated by the B modulation illustrated in FIG. 7.

In other words, what is important, in order to realize phase modulation with the number of modulations N=16, in accordance with the coarse phase modulation indicated by the A modulation illustrated in FIG. 7 described above and the fine phase modulation indicated by the B modulation illustrated in FIG. 7, is as follows. That is, it is important for the phase rotation amount (peak-to-peak), which is specified by the range VP2 for the fine phase modulation element 62B, to be ¼ of the phase rotation amount (peak-to-peak), which is specified by the range VP1 for the coarse phase modulation element 62A.

Here, the phase rotation amount (peak-to-peak) is defined as follows. That is, the absolute value of the difference between the maximum phase and the minimum phase from among phases that can be rotated to by a phase adjustment element is the phase rotation amount (peak-to-peak). For example, phase rotation amount (peak-to-peak) for the coarse phase modulation indicated by the A modulation illustrated in FIG. 7 described above is 3π/2 as indicated by the range VP1. A technique of specifying the phase rotation amount (peak-to-peak) by the maximum phase and the minimum phase may be used instead of the phase rotation amount (peak-to-peak) in accordance with this definition, but the level will change in accordance with the arrangement of symbol points in this case. Therefore, it is desirable to employ the phase rotation amount (peak-to-peak) in accordance with the definition described above.

To summarize the above, by employing the encryption unit 13 illustrated in FIG. 6, phase modulation as follows becomes possible. That is, phase modulation with the number of modulations N=the number of coarse modulations M1× the number of fine modulations M2 becomes possible. In this case, a phase rotation amount (peak-to-peak) Ia for the coarse phase modulation element 62A is represented by the following formula (1).

$$\frac{2\pi}{M_1} \times (M_1 - 1) \tag{1}$$

In addition, a phase rotation amount (peak-to-peak) Ib for the fine phase modulation element 62B is set so that a ratio with the phase rotation amount (peak-to-peak) Ia of the coarse phase modulation element 62A, that is Ib/Ia is represented by the following formula (2).

$$\frac{1}{M_1 - 1} \times \left(1 - \frac{1}{M_2}\right) \tag{2}$$

It is desirable for the number of coarse modulations M1 and the number of fine modulations M2 to be as large as possible in order to improve the security of the Y-00 optical communication quantum cipher. For example, configuration may be taken to have the number of coarse modulations M1=64 and have the number of fine modulations M2=1024.

Figure 8:
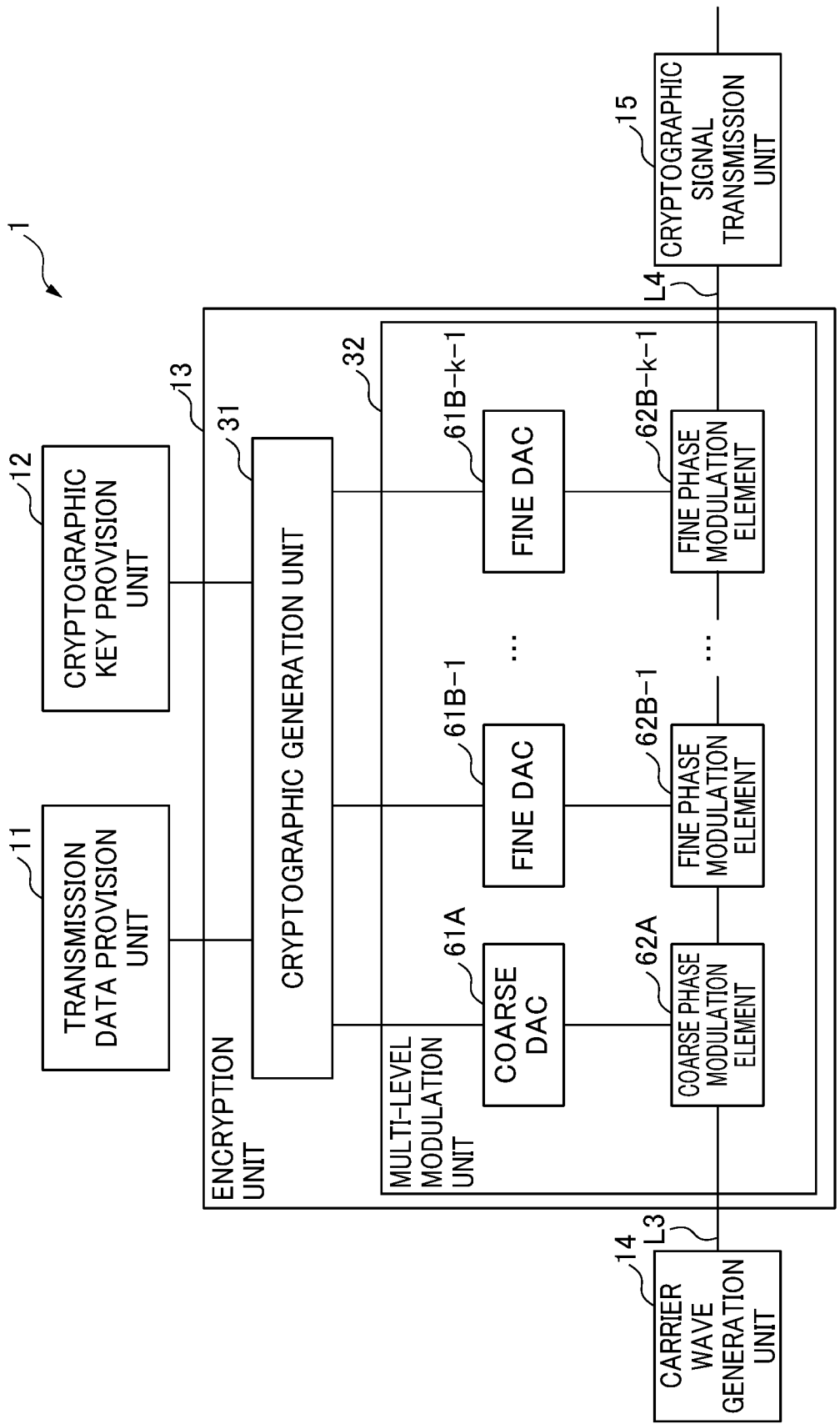
FIG. 8 is a block diagram illustrating an example of a detailed configuration of an encryption unit resulting from applying the new technique to the basic encryption unit of FIG. 4, in other words a second example of an encryption unit in which the present invention is applied.

Furthermore, the number of fine modulation elements does not particularly need to be one as illustrated in FIG. 7, and may be a plurality as illustrated in FIG. 8. FIG. 8 is a block diagram illustrating an example of a detailed configuration of an encryption unit resulting from applying the new technique to the basic encryption unit of FIG. 4, in other words a second example of an encryption unit in which the present invention is applied.

Phase modulation with k=2 stages is performed in the example of FIG. 7, whereas phase modulation with k stages where k is 3 or more is performed in the example of FIG. 8. In other words, in the example of FIG. 8, coarse modulation with the number of modulations M1 is performed and fine modulation is respectively performed (k−1) times with the number of modulations M2 through Mk, so that modulation with the overall number of modulations N=M1×M2× . . . ×Mk is performed.

The encryption unit 13 of the example of FIG. 8 is provided with the cryptographic generation unit 31 and the multi-level modulation unit 32. The cryptographic generation unit 31 of the example of FIG. 8 has an essentially similar function to that of the cryptographic generation unit 31 of the example of FIG. 6. However, the manner of output by the cryptographic generation unit 31 of the example of FIG. 8 differs in comparison to the cryptographic generation unit 31 of the example of FIG. 6 as follows. That is, the cryptographic generation unit 31 of the example of FIG. 6 outputs coarse multi-level data as well as a first type of fine multi-level data. In contrast to this, the cryptographic generation unit 31 of the example of FIG. 8 outputs coarse multi-level data as well as (k−1) types of fine multi-level data.

In other words, in comparison to the multi-level modulation unit 32 of the example of FIG. 6, the multi-level modulation unit 32 of the example of FIG. 8 has a similar configuration for coarse modulation (the configuration for the group of the coarse DAC 61A and the coarse phase modulation element 62A), but the configuration for fine modulation differs as follows. That is, a difference is that in FIG. 8 there are (k−1) types of groups of a fine DAC 61B-L (L is an integer from 1 through (k−1)) and a fine phase modulation element 62B-L in comparison to the one type in the example of FIG. 6. By this, an optical signal to which coarse modulation with the number of modulations M1 has been performed and then fine modulation has been respectively performed (k−1) times with the number of modulations M2 through Mk is outputted from the multi-level modulation unit 32 of the example of FIG. 8, and this optical signal is supplied to the cryptographic signal transmission unit 15. In other words, in the example of FIG. 8, with k=3 stages or more, coarse modulation with the number of modulations M1 is performed and fine modulation is respectively performed (k−1) times with the number of modulations M2 through Mk, so that modulation with the overall number of modulations N=M1×M2× . . . ×Mk is performed.

Even in the case where k=3 stages or more in the example of FIG. 8, similarly with k=2 stages, the phase rotation amount (peak-to-peak) Ia of the coarse phase modulation element 62A is represented by formula (1) described above. In contrast, a phase rotation amount (peak-to-peak) In for the nth (n is value from 2 through k) fine phase modulation element 62B-n is set so that a ratio with the phase rotation amount (peak-to-peak) of the coarse phase modulation element 62A, that is In/Ia is represented by the following formula (3). Where Π is the symbol for the product of a sequence of factors.

$$\frac{1}{M_1 - 1} \times \frac{1}{\prod_{i=2}^{n-1} M_i} \times \left(1 - \frac{1}{M_n}\right) \quad (3)$$

Figure 9:
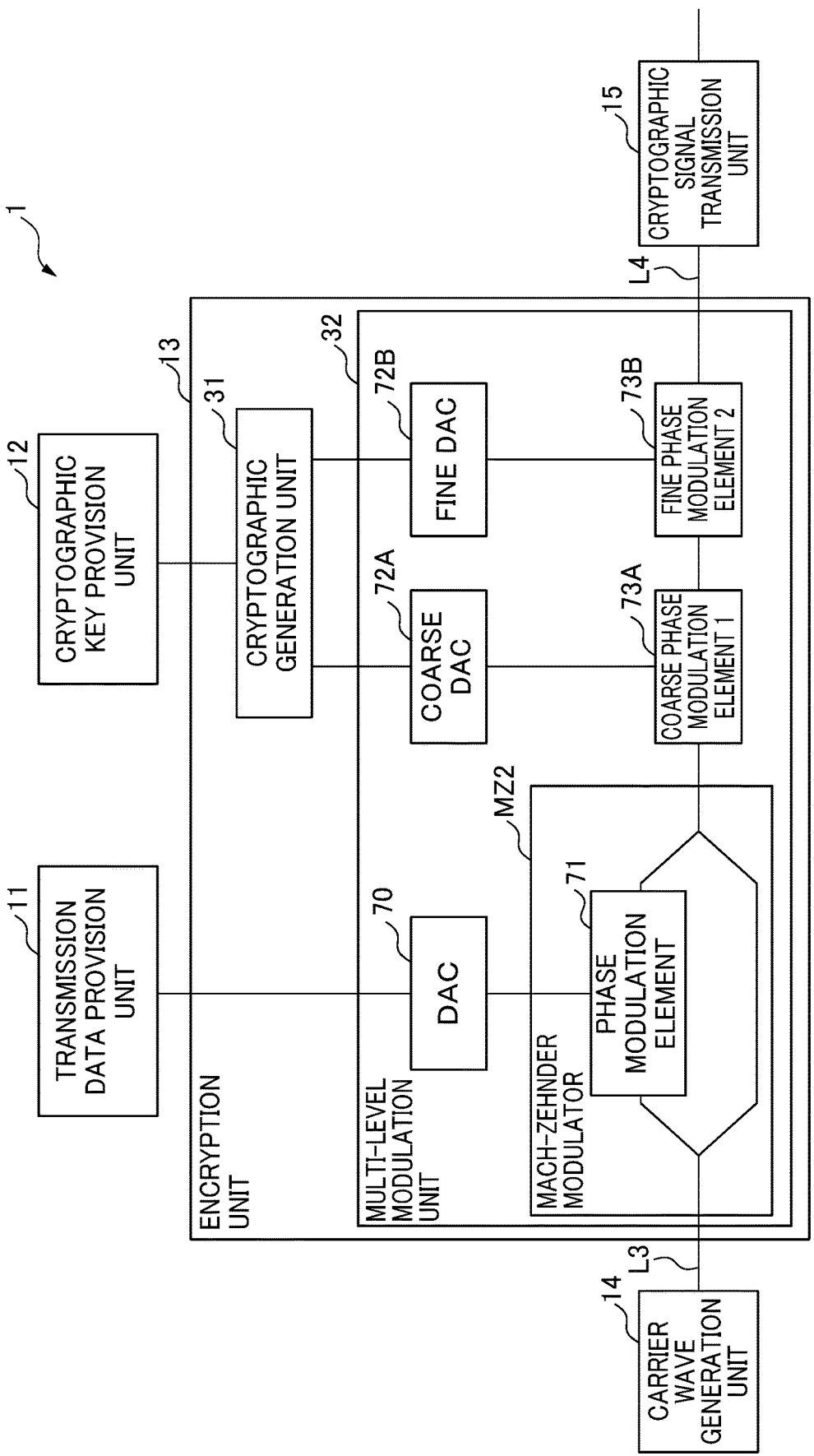
FIG. 9 is a block diagram illustrating an example of a detailed configuration of an encryption unit resulting from applying the new technique to the encryption unit 13 illustrated in FIG. 5, in other words a third example of an encryption unit in which the present invention is applied.

FIG. 9 is a block diagram illustrating an example of a detailed configuration of an encryption unit resulting from applying the new technique to the basic encryption unit of FIG. 5, in other words a third example of an encryption unit in which the present invention is applied.

The encryption unit 13 of the example of FIG. 9 is provided with the cryptographic generation unit 31 and the multi-level modulation unit 32. The transmission data provided from the transmission data provision unit 11 is directly supplied to the multi-level modulation unit 32 without going through the cryptographic generation unit 31. The cryptographic generation unit 31 of the example of FIG. 9 uses the cryptographic key provided by the cryptographic key provision unit 12 to generate respective multi-levels for coarse modulation and fine modulation, and respectively provides these multi-levels to a coarse DAC 72A and a fine DAC 72B which are described below.

The multi-level modulation unit 32 of the example of FIG. 9 is provided with a DAC 70, a Mach-Zehnder modulator MZ2 that includes a phase modulation element 71, a coarse DAC 72A, a coarse phase modulation element 73A, a fine DAC 72B, and a fine phase modulation element 73B.

In other words, the DAC 70 and the Mach-Zehnder modulator MZ2 have a similar configuration to that of the DAC 51 and the Mach-Zehnder modulator MZ1 of the example of FIG. 5. However, while the group of the DAC 53 and the phase modulation element 54 are arranged as a stage after the DAC 51 and the Mach-Zehnder modulator MZ1 in the example of FIG. 5, a group of the coarse DAC 72A and the coarse phase modulation element 73A and a group of the fine DAC 72B and the fine phase modulation element 73B are arranged in this order in the example of FIG. 9. The group of the coarse DAC 72A the coarse phase modulation element 73A and the group of the fine DAC 72B and the fine phase modulation element 73B in the example of FIG. 9 are respectively similar to the group of the coarse DAC 61A and the coarse phase modulation element 62A and the group of the fine DAC 61B and the fine phase modulation element 62B of the example of FIG. 6.

In other words, the product of the number of modulations N1 (=2) of data modulation in the Mach-Zehnder modulator MZ2 corresponding to each item of bit data with the number of modulations M1 for coarse modulation and the number of modulations M2 for fine modulation in accordance with encryption—that is 2×M1×M2—is the overall number of phase modulations N. In other words, ½ of the M1×M2 of the example in FIG. 6 may be set as M1×M2 in the example of FIG. 9.

Figure 10:
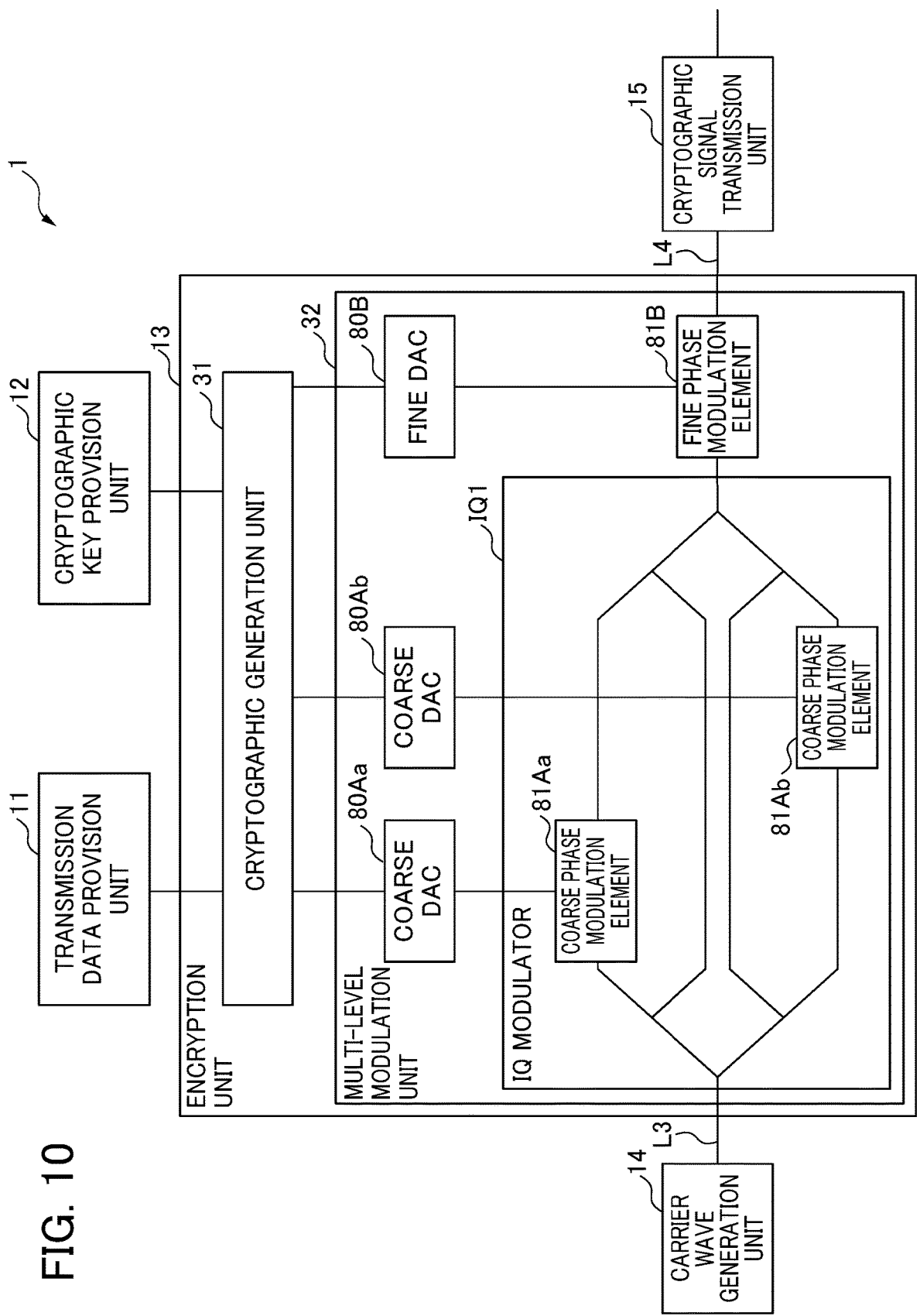
FIG. 10 is a block diagram illustrating an example of a detailed configuration of an encryption unit, in which a configuration that uses an IQ modulator has been employed as a configuration for coarse modulation of the first example of the encryption unit illustrated in FIG. 6 in which the present invention is applied, in other words a fourth example of an encryption unit in which the present invention is applied.

FIG. 10 is a block diagram illustrating an example of a detailed configuration of an encryption unit, in which a configuration that uses an IQ modulator has been employed as the configuration for coarse modulation of the first example of the encryption unit illustrated in FIG. 6 in which the present invention is applied, in other words a fourth example of an encryption unit in which the present invention is applied.

The encryption unit 13 of the example of FIG. 10 is provided with the cryptographic generation unit 31 and the multi-level modulation unit 32. The cryptographic generation unit 31 of the example of FIG. 10 has an essentially similar function and configuration to that of the cryptographic generation unit 31 of the example of FIG. 6. In contrast, in comparison to the multi-level modulation unit 32 of the example of FIG. 6, the multi-level modulation unit 32 of the example of FIG. 10 has a different configuration for coarse modulation with the number of coarse modulations M1. That is, the coarse DAC 61A and the coarse phase modulation element 62A are provided in the multi-level modulation unit 32 of the example of FIG. 6. In contrast to this, the multi-level modulation unit 32 of the example of FIG. 10 is provided with two coarse DACs 80Aa and 80Ab and an IQ modulator IQ1 that includes two coarse phase modulation element 81Aa and 81Ab.

The IQ modulator IQ1 is the following type of modulator. In other words, it is a modulator configured by two interferometers which have a Mach-Zehnder and a further interferometer, in which an inputted optical signal is split into four signal paths, and the optical signal that travels along respective signal paths interfere with each other and are outputted. At this point, by interposing phase modulation elements (the two coarse phase modulation elements 81Aa and 81Ab in the example of FIG. 10) on at least two of the signal paths from among the split signal paths, it becomes possible to cause light to occur at any point on the IQ plane (in other words, at any amplitude and phase).

The multi-level voltages outputted from the coarse DACs 80Aa and 80Ab are respectively 2 (=N1) and M1 voltages. Here, 2 (=N1) is the number of modulations for data modulation in the IQ modulator IQ'. M1 is the number of coarse modulations in each of the coarse phase modulation elements 81Aa and 81Ab.

The group of the fine DAC 80B and the fine phase modulation element 81B in the example of FIG. 10 and the group of the fine DAC 61B and the fine phase modulation element 62B in the example of FIG. 6 have essentially the same function and configuration. In other words, the configuration for fine modulation is the same between the example of FIG. 10 and the example of FIG. 6. In other words, in a case where the IQ modulator IQ1 is employed as a configuration for coarse modulation, the configuration for fine modulation in the example of FIG. 10 is merely an example, and, although no illustration is given, it is possible to employ a configuration similar to that in the example of FIG. 8 for example, in other words a configuration where fine modulation is performed (k−1) times with k=3 or more.

Thus far, examples of performing multi-level phase modulation with respect to an optical signal have been given as embodiments of the present invention. However, these embodiments are merely examples, and the present invention can be broadly applied to processing that modulates a signal to one from among a plurality of patterns. In other words, in the examples described above, a method of causing rotation to a phase from among multi-level phases (an example of a plurality of patterns) is employed as an example of such processing. Furthermore, multi-level amplitude (intensity) modulation of an optical signal as illustrated in FIG. 11, in other words a method that modulates to an intensity from among multi-level intensities (another example of a plurality of patterns) may be employed.

Figure 11:
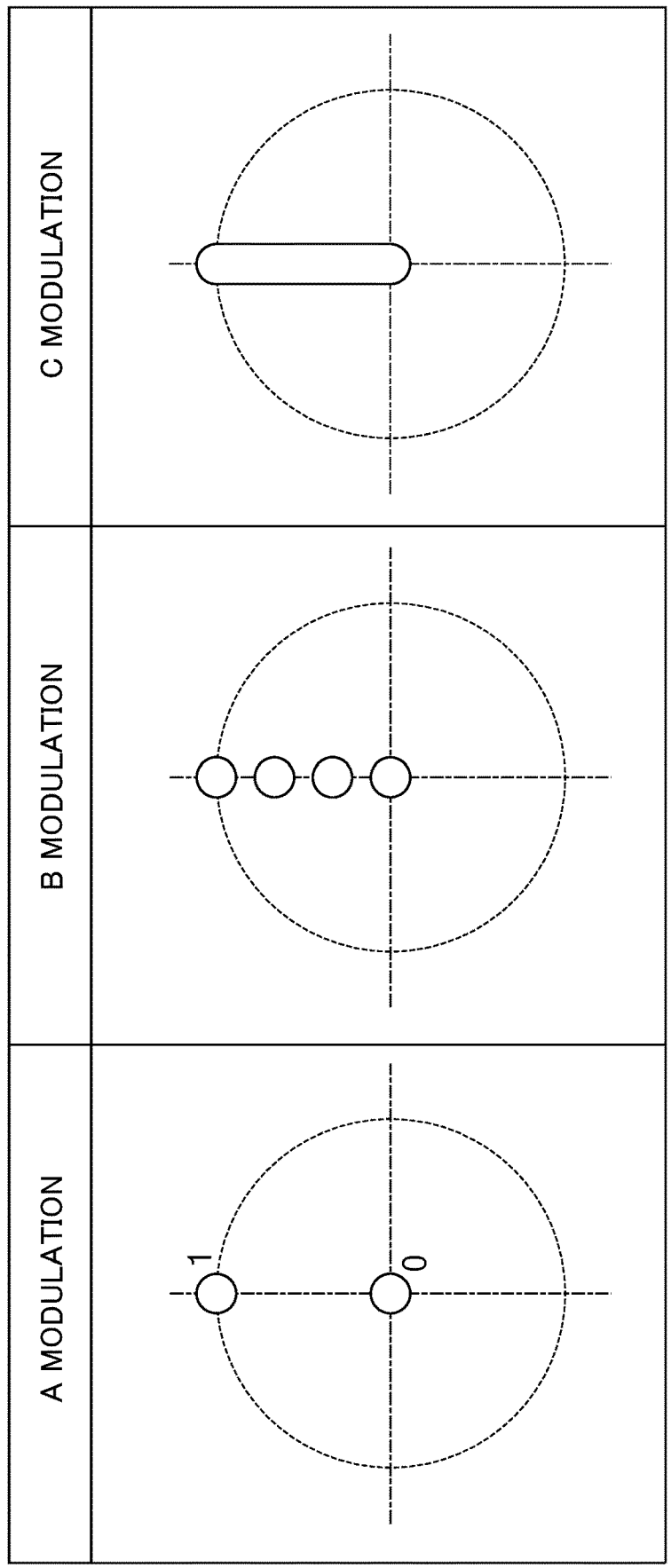
FIG. 11 is a view for describing an overview of principles of the Y-00 optical communication quantum cipher in which amplitude modulation is employed instead of phase modulation.

FIG. 11 is a view for describing an overview of principles of the Y-00 optical communication quantum cipher in a case where amplitude modulation is employed instead of phase modulation. The A modulation through C modulation shown in FIG. 11 illustrate IQ planes that represent the phase and amplitude (intensity) of an optical signal, with the intersection of the vertical axis and the horizontal axis as the origin.

The A modulation illustrated in FIG. 11 is to facilitate understanding of the Y-00 optical communication quantum cipher, and is a graph for describing the principles of normal two-level modulation. For example, if plaintext (transmission data) is superimposed as is on an optical signal (carrier wave) and transmitted, two-level modulation indicated as the A modulation illustrated in FIG. 11 will be applied on each item of bit data (1 or 0) that makes up the plaintext. Specifically, for example, in the A modulation illustrated in FIG. 11, the arrangement of the symbol point after amplitude modulation in the case where the bit data is "0" is the arrangement of a point set as the origin 0 on the vertical axis, in other words an arrangement for which intensity (amplitude) is the minimum (distance 0). Meanwhile, the arrangement of the symbol point in the case where the bit data is "1" is the arrangement of a point set as 1 on the vertical axis, in other words an arrangement for which the intensity is the maximum (distance 1).

The B modulation illustrated in FIG. 11 is to describe principles of four-level amplitude modulation in a case where the Y-00 optical communication quantum cipher is employed. In the case of the example of B modulation illustrated in FIG. 11, a random level from among four levels is generated by using the cryptographic key, for each item of bit data (1 or 0) that makes up the plaintext. Amplitude modulation is performed by expanding or contracting the distance of the symbol point (the point for the intensity minimum corresponding to 0 and the point for the intensity maximum corresponding to 1) with the normal two-level modulation indicated in the A modulation illustrated in FIG. 11 to give a point where the distance is 0, ⅓, ⅔ or 1 (four levels), for each bit in accordance with a level that is randomly generated from these four levels.

However, similarly to the example of the B modulation illustrated in FIG. 2 which is described above, the case of the example of the B modulation illustrated in FIG. 11 is not sufficient from a perspective of security of the Y-00 optical communication quantum cipher. Accordingly, in practice, as indicated by the C modulation illustrated in FIG. 11, a very large number, for example 4096, is employed as the number of modulations N, and the security of the Y-00 optical communication quantum cipher is improved. The C modulation illustrated in FIG. 11 is to describe principles of amplitude modulation when the number of modulations N=4096, in a case where the Y-00 optical communication quantum cipher is employed.

Figure 12:
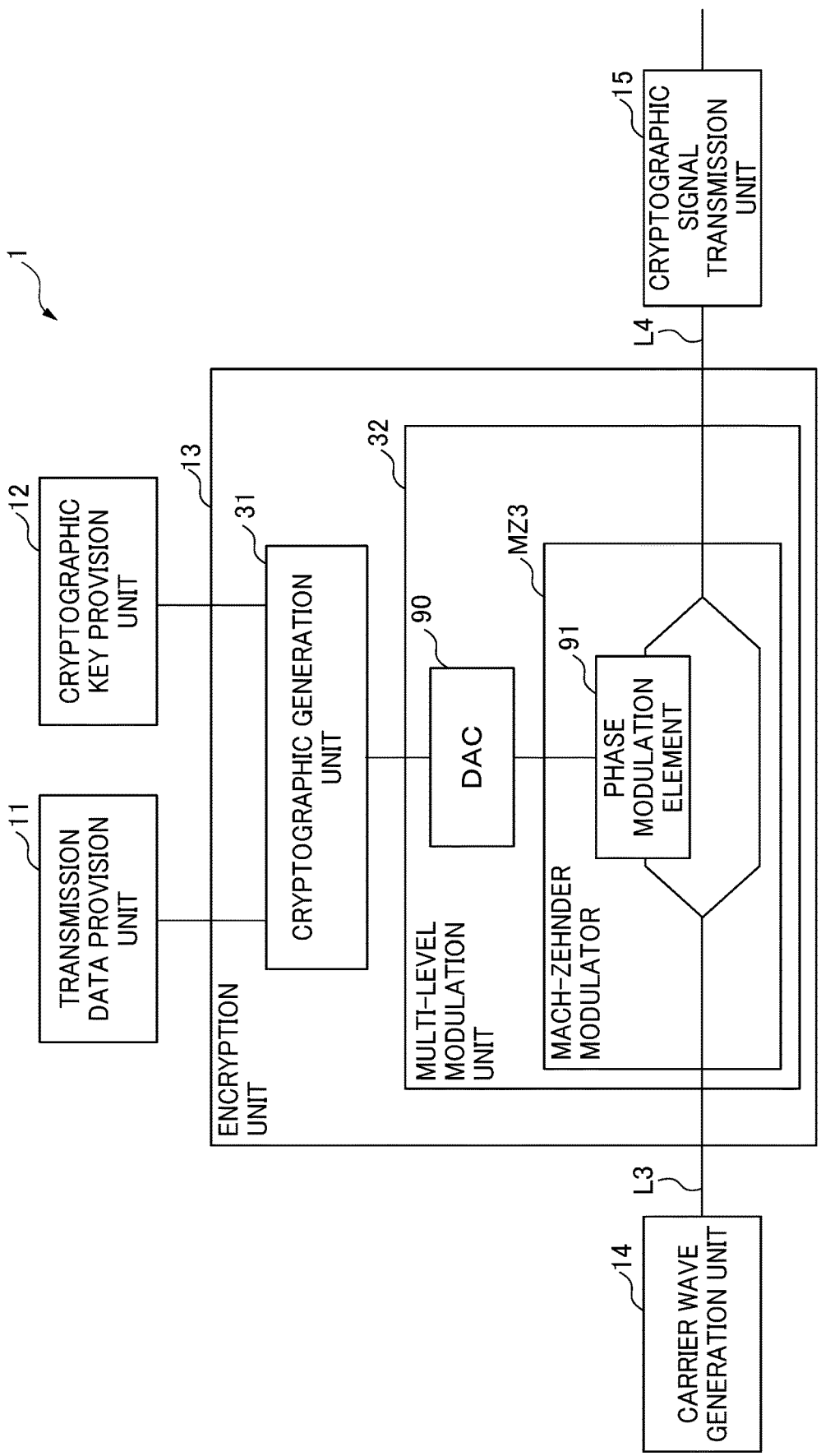
FIG. 12 is a block diagram illustrating an example of a detailed configuration of a basic encryption unit, in a case where amplitude modulation is employed instead of phase modulation.

FIG. 12 is a block diagram illustrating an example of a detailed configuration of the basic encryption unit 13, in a case where amplitude modulation is employed instead of phase modulation.

Amplitude modulation can be realized by having a phase modulation element take the configuration of an interferometer (a typical example is a Mach-Zehnder interferometer), for example. In the example of FIG. 12, an example of a configuration that uses a Mach-Zehnder modulator is employed.

The encryption unit 13 of the example of FIG. 12 is provided with the cryptographic generation unit 31 and the multi-level modulation unit 32. The cryptographic generation unit 31 of the example of FIG. 12 has an essentially similar function to that of the cryptographic generation unit 31 of the example of FIG. 6. The multi-level modulation unit 32 of the example of FIG. 12 is provided with a DAC 90 and a Mach-Zehnder modulator MZ3 that includes a phase modulation element 91. The encryption units 13 illustrated in FIG. 13 and thereafter are realized by applying the new technique described above, in other words the technique of performing coarse modulation once with the number of modulations M1 and subsequently performing fine modulation (k−1) times with the respective number of modulations M2 through Mk to give the number of modulations N=M1× M2× . . . ×Mk, to the example of FIG. 12. That is, the encryption units 13 illustrated in FIG. 13 and thereafter are examples of various types that are different to the above-described examples of the encryption unit 13 to which the present invention has been applied.

Figure 13:
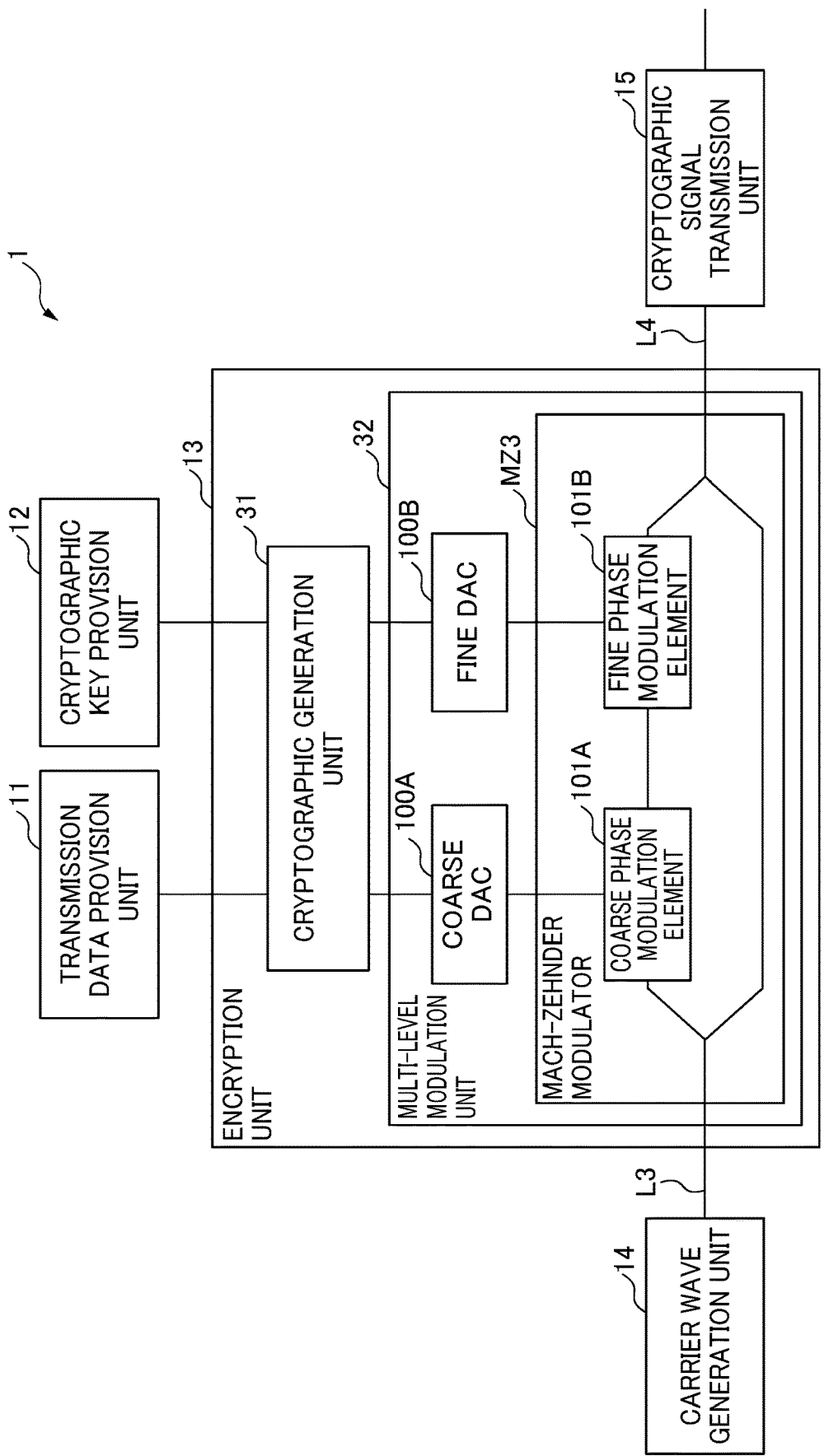
FIG. 13 is a block diagram illustrating an example of a detailed configuration of an encryption unit resulting from applying the new technique to the basic encryption unit of FIG. 12 in which amplitude modulation is employed, in other words a fifth example of an encryption unit in which the present invention is applied.

FIG. 13 is a block diagram illustrating an example of a detailed configuration of an encryption unit resulting from applying the new technique to the basic encryption unit of FIG. 12 in which amplitude modulation is employed, in other words a fifth example of an encryption unit in which the present invention is applied.

The example of FIG. 13 employs a coarse DAC 100A, a fine DAC 100B, a coarse phase modulation element 101A, and a fine phase modulation element 101B instead of the DAC 90 and the phase modulation element 91 of the example of FIG. 12. The coarse phase modulation element 101A and the fine phase modulation element 101B are serially connected in one of the two paths in the Mach-Zehnder modulator MZ3.

The modulation amplitude (peak-to-peak) in amplitude modulation can be defined as follows. That is, the absolute value of the difference between the maximum amplitude and the minimum amplitude from output modulated amplitudes in the optical system (for example, a Mach-Zehnder interferometer configuration and a phase modulation element incorporated therein) for amplitude modulation is the modulation amplitude (peak-to-peak). However, in a case where reception with a square-law detection method that observes an intensity corresponding to the square of the amplitude is employed, the absolute value of the difference between the maximum intensity and the minimum intensity is the modulation amplitude (peak-to-peak).

The modulation amplitude (peak-to-peak) is used to give a description below of the amount of modulation in the coarse modulation and fine modulation of the example of FIG. 13. A modulation amplitude (peak-to-peak) Ia for coarse modulation with the number of coarse modulations M1 is an amount in accordance with output of the carrier wave and thus is not limited. It is desirable for a modulation amplitude (peak-to-peak) Ib for fine modulation with the number of fine modulations M2 to be set so that a ratio with the modulation amplitude (peak-to-peak) Ia for coarse modulation, that is Ib/Ia is represented by the following formula (4).

$$\frac{1}{M_1-1} \times \left(1 - \frac{1}{M_2}\right) \quad (4)$$

Furthermore, in the case where the new technique described above, in other words, with the number of modulations N=M1×M2×...×Mk, performing coarse modulation once with the number of modulations M1 and subsequently performing fine modulation (k−1) times respectively with the number of modulations M2 through Mk, is performed for amplitude modulation, it is desirable for a modulation amplitude (peak-to-peak) In (n is any one of 2 through k) representing the nth range for the nth second modulation element to be such that a ratio with the modulation amplitude (peak-to-peak) Ia for coarse modulation with the number of modulations M1, in other words In/Ia is represented by the following formula (5). Where Π is the symbol for the product of a sequence of factors.

$$\frac{1}{M_1-1} \times \frac{1}{\prod_{i=2}^{n-1} M_i} \times \left(1 - \frac{1}{M_n}\right) \quad (5)$$

Figure 14:
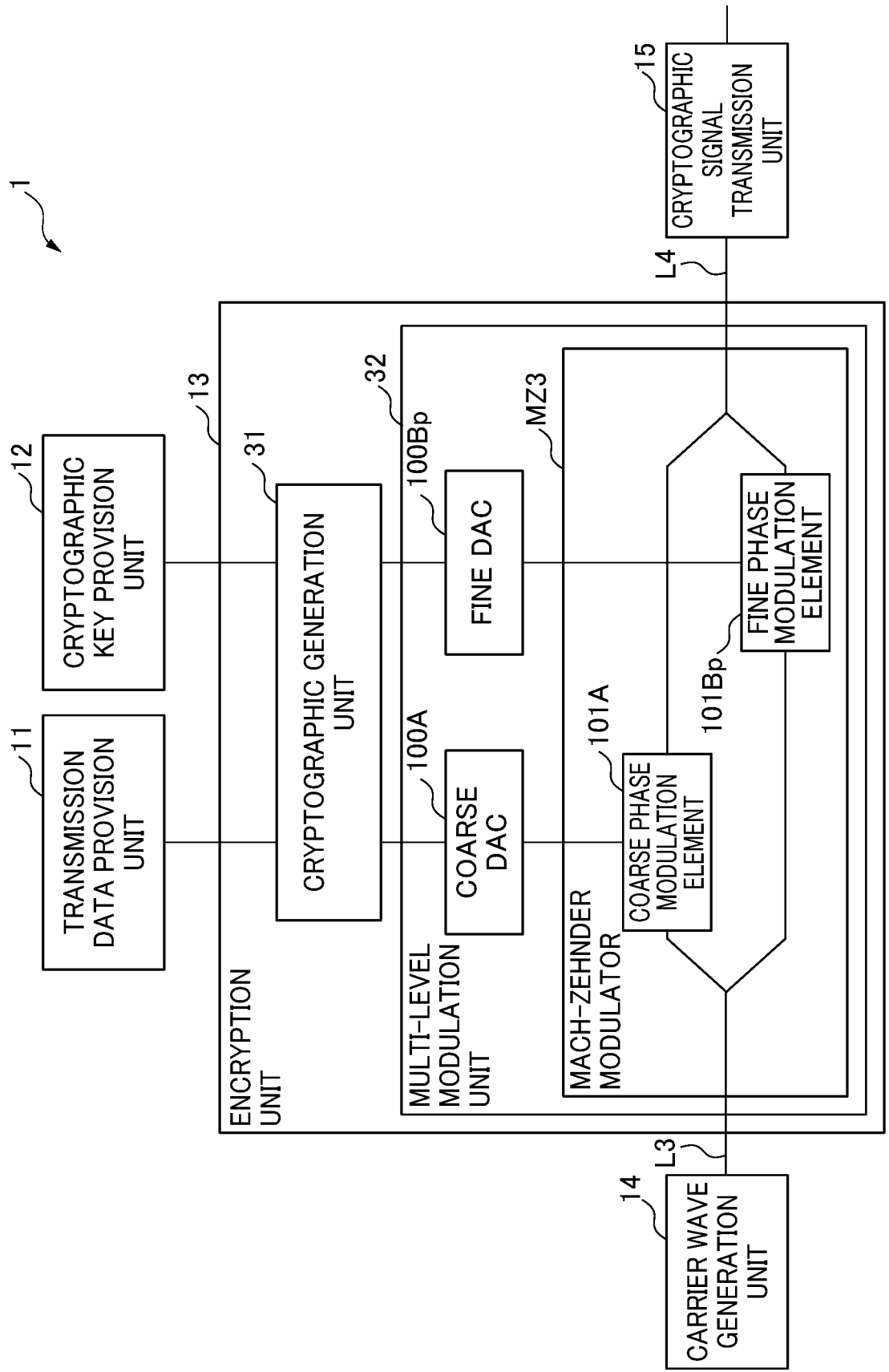
FIG. 14 is a block diagram illustrating an example of a detailed configuration of an encryption unit resulting from applying the new technique to the basic encryption unit of FIG. 12 in which amplitude modulation is employed, in other words a sixth example of an encryption unit in which the present invention is applied.

FIG. 14 is a block diagram illustrating an example of a detailed configuration of an encryption unit resulting from applying the new technique to the basic encryption unit of FIG. 12 in which amplitude modulation is employed, in other words a sixth example of an encryption unit in which the present invention is applied.

The example of FIG. 14 employs the coarse DAC 100A, a fine DAC 100Bp, a coarse phase modulation element 101A, and a fine phase modulation element 101Bp instead of the DAC 90 and the phase modulation element 91 of the example of FIG. 12. The primary components are similar to the example of FIG. 14 and the example of FIG. 13, with the following differences. That is, the coarse phase modulation element 101A and the fine phase modulation element 101B are serially connected in one of two paths in the Mach-Zehnder modulator MZ3 in the example of FIG. 13, whereas the coarse phase modulation element 101A and the fine phase modulation element 101Bp are connected in parallel by being respectively arranged in the two paths in the Mach-Zehnder modulator MZ3 in the example of FIG. 14. In the example of FIG. 14, the change from the arrangement of the fine phase modulation element 101B in the example of FIG. 13, in other words the fine phase modulation element connected in parallel to the coarse phase modulation element 101A, is illustrated as the fine phase modulation element 101Bp. In amplitude modulation that uses a Mach-Zehnder modulator, in a case of arranging in parallel phase modulation elements that were arranged in series, it is possible to achieve a similar effect to that of the series arrangement by inverting the polarity (the voltage which is positive or negative is inverted) of one of the phase modulation elements arranged in parallel. Accordingly, differing to the example of FIG. 13, in the example of FIG. 14, the polarity of the drive signal for the fine DAC 100Bp is inverted in relation to the polarity of the drive signal for the fine DAC 100B in the example of FIG. 13.

Examples of performing multi-level phase modulation or multi-level amplitude (intensity) modulation as modulation with respect to an optical signal have been given above as embodiments of the present invention. In other words, in the examples described above, a method of performing modulation (rotation to a phase of any level or changing the amplitude) to any pattern from among a plurality of patterns prepared in advance, where only one of multi-level phases and multi-level (intensities) amplitudes are used, is employed. However, there is no particular need to prepare only multi-level phases or multi-level amplitudes for the plurality of patterns. The plurality of patterns may be prepared by combining phases of one or more levels and amplitudes of one or more levels. In other words, the present invention can be applied to multi-level modulation that combines phase modulation and amplitude (intensity) modulation as modulation with respect to an optical signal.

Figure 15:
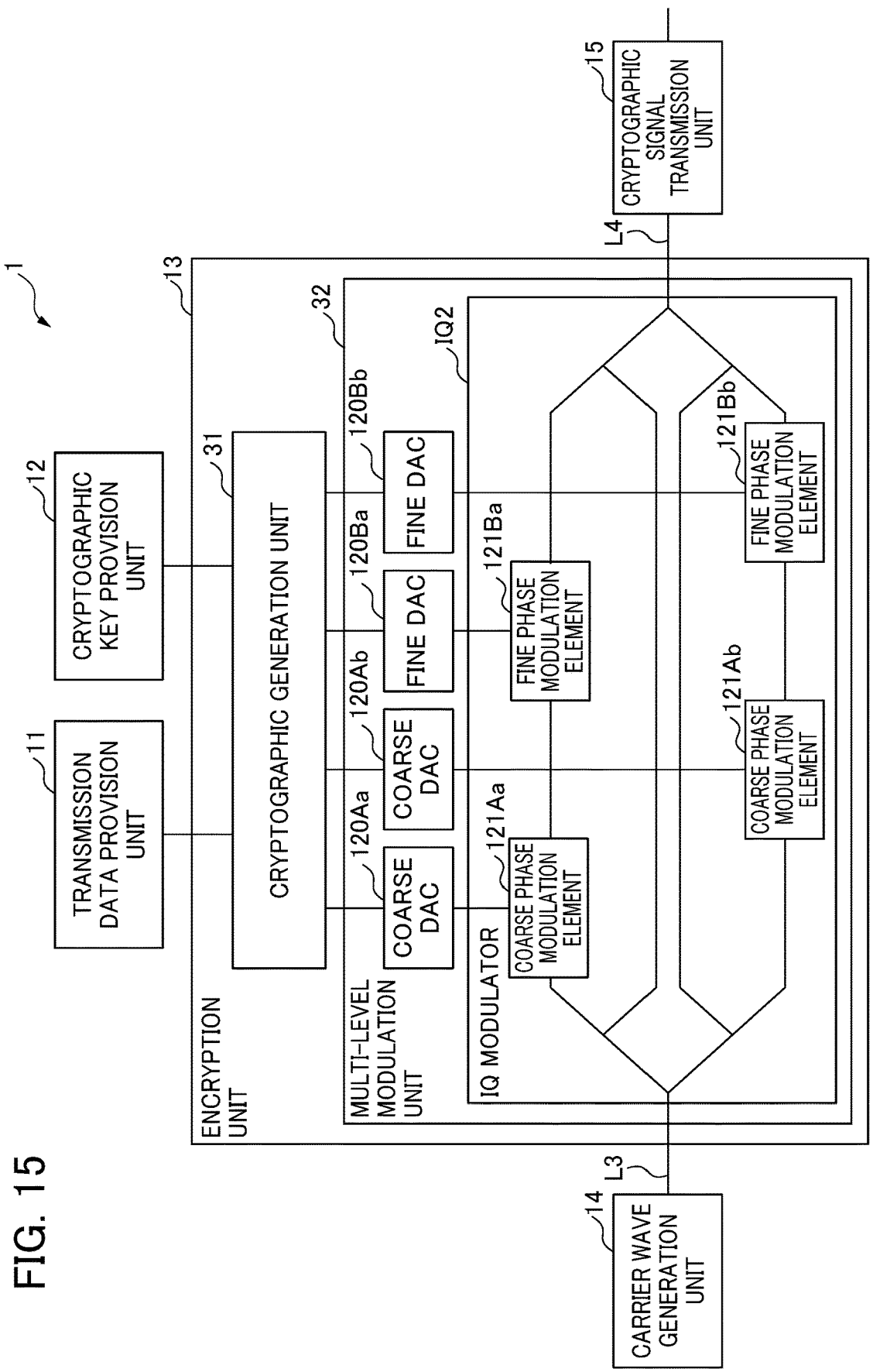
FIG. 15 is a block diagram illustrating an example of a detailed configuration of a seventh example of an encryption unit in which the present invention is applied, in a case of application to multi-level modulation, which combines phase modulation and amplitude (intensity) modulation as modulation with respect to an optical signal.

FIG. 15 is a block diagram illustrating an example of a detailed configuration of a seventh example of an encryption unit in which the present invention is applied, in a case of application to multi-level modulation, which combines phase modulation and amplitude (intensity) modulation as modulation for an optical signal.

As illustrated in FIG. 15, both of phase modulation and amplitude modulation can be realized by having a configuration that uses an IQ modulator IQ2. In other words, the multi-level modulation unit 32 of the example of FIG. 15 is configured so as to include a coarse DAC 120Aa, a coarse DAC 120Ab, a fine DAC 120Ba, and a fine DAC 120Bb. The multi-level modulation unit 32 of the example of FIG. 15 is configured so as to include the IQ modulator IQ2, which has a coarse phase modulation element 121Aa, a coarse phase modulation element 121Ab, a fine phase modulation element 121Ba, and a fine phase modulation element 121Bb.

The IQ modulator IQ2 is configured by connecting a first Mach-Zehnder modulator and a second Mach-Zehnder modulator in parallel. The coarse phase modulation element 121Aa and the fine phase modulation element 121Ba are serially connected in one of the two paths in the first Mach-Zehnder modulator. The coarse phase modulation element 121Ab and the fine phase modulation element 121Bb are serially connected in one of the two paths in the second Mach-Zehnder modulator.

Figure 16:
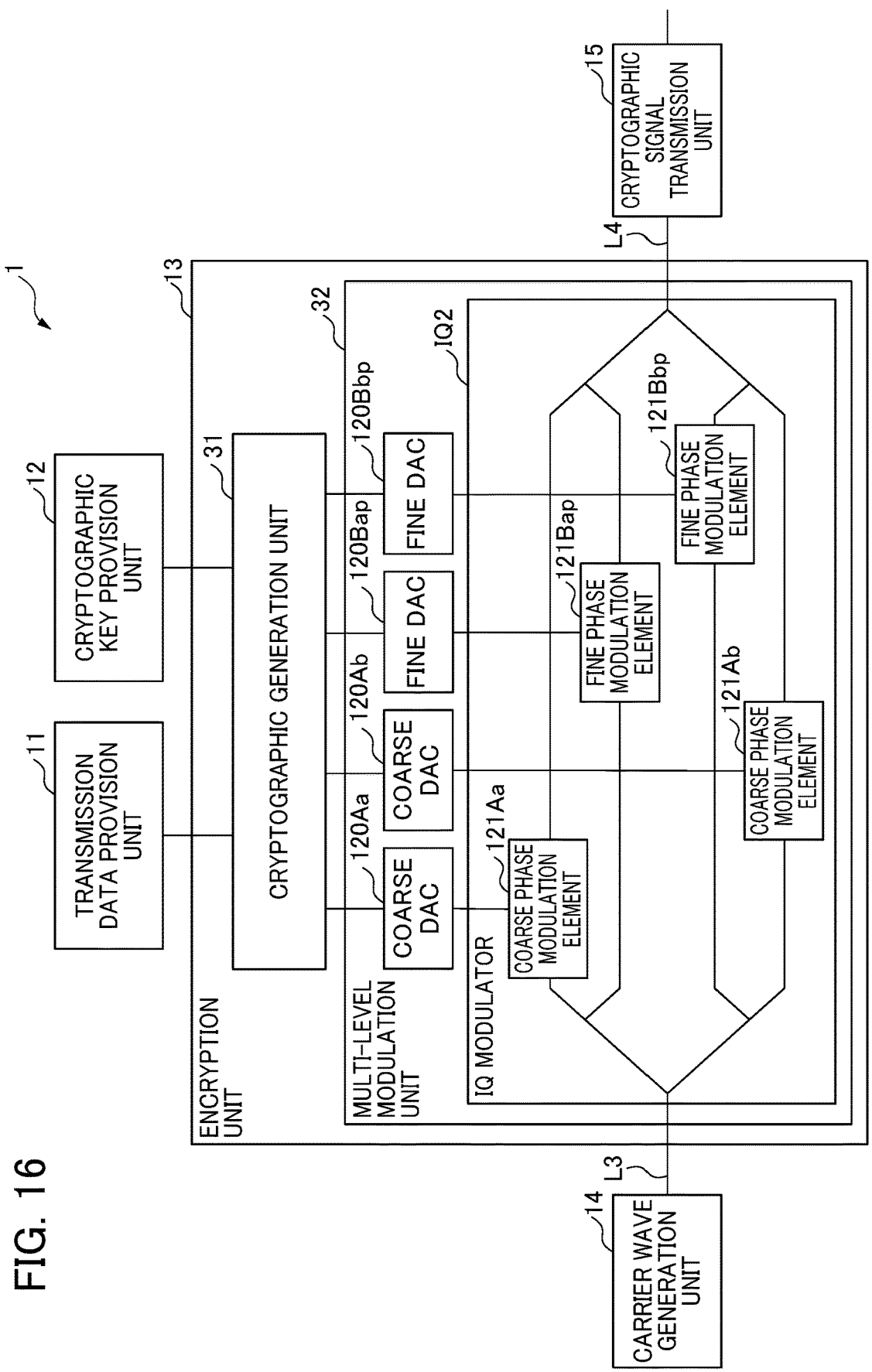
FIG. 16 is a block diagram illustrating a modification of the example of FIG. 15, in other words an example of a detailed configuration of an eighth example of an encryption unit in which the present invention is applied, in a case of application to multi-level modulation, which combines phase modulation and amplitude (intensity) modulation as modulation with respect to an optical signal.

FIG. 16 is a block diagram illustrating a modification of the example of FIG. 15, in other words an example of a detailed configuration of an eighth example of an encryption unit in which the present invention is applied, in a case of application to multi-level modulation, which combines phase modulation and amplitude (intensity) modulation as modulation with respect to an optical signal.

The multi-level modulation unit 32 of the example of FIG. 16 has essentially similar components to those of the example of FIG. 15, and is configured so as to include the coarse DAC 120Aa, the coarse DAC 120Ab, a fine DAC 120Bap, and a fine DAC 120Bbp. The multi-level modulation unit 32 of the example of FIG. 16 has essentially similar components to those of the example of FIG. 15, and is configured so as to include the IQ modulator IQ2 which has the coarse phase modulation element 121Aa, the coarse phase modulation element 121Ab, a fine phase modulation element 121Bap, and a fine phase modulation element 121Bbp.

However, in the example of FIG. 16, the coarse phase modulation element 121Aa and the fine phase modulation element 121Bap are connected in parallel by being arranged in respective ones of the two paths in the first Mach-Zehnder modulator. In addition, the coarse phase modulation element 121Ab and the fine phase modulation element 121Bbp are connected in parallel by being arranged in respective ones of the two paths in the second Mach-Zehnder modulator. In the example of FIG. 16, the change from the arrangement of the fine phase modulation element 121Ba in the example of FIG. 15, in other words the fine phase modulation element connected in parallel to the coarse phase modulation element 121Aa, is illustrated as the fine phase modulation element 121Bap. Similarly, the change from the arrangement of the fine phase modulation element 121Bb in the example of FIG. 15, in other words the fine phase modulation element connected in parallel to the coarse phase modulation element 121Ab, is illustrated as the fine phase modulation element 121Bbp.

In other words, in a case of employing multi-level modulation that combines phase modulation and amplitude (intensity) modulation as modulation with respect to an optical signal and using an IQ modulator, the coarse phase modulation elements and the fine phase modulation elements are respectively arranged on any of two or more paths. In this case, for example, the polarity of each of the coarse DACs and fine DACs is inverted if necessary.

Various embodiments of the optical transmission device 1 to which the present invention is applied are described above. However, for the optical transmission device 1 to which the present invention is applied, it is sufficient if improvement of the overall number of modulations N can be achieved by performing coarse modulation and fine modulation, and the configuration of the optical transmission device 1 is not limited to the various embodiments described above and may be as follows, for example.

For example, in the embodiments described above, for the convenience of the description, the optical communication cable 3 is employed as the transmission path for the optical signal transmitted from the optical transmission device 1 and received by the optical reception device 2, but there is no particular limitation to this. For example, a device for optical communication such as an optical amplifier, an optical switch, or a wavelength switch may be inserted between the optical communication cable 3 and the optical transmission device 1 or the optical reception device 2. In addition, an optical transmission path is not limited to something that uses an optical fiber, and may comprise a communication path such that propagation is performed over a so-called optical wireless space, for example. In other words, any communication channel may be used between the optical communication cable 3 and the optical transmission device 1 or the optical reception device 2.

The transmission data provision unit 11 is incorporated in the optical transmission device 1, but the transmission data may be received from outside of the optical transmission device in accordance with a predetermined reception means that is wired or wireless, by providing the transmission data reception unit (not illustrated). Furthermore, a storage device (not illustrated) or removable media may be used to provide the transmission data. In other words, the transmission data provision unit may have any kind of transmission data obtainment means.

The cryptographic key provision unit 12 may provide a key sufficient for the encryption unit 13 to generate multi-level data relating to encryption. In other words, the cryptographic key may be a shared key, and may be a key that uses a different algorithm such as a private key and a public key.

The carrier wave generation unit 14 does not need to be incorporated in the optical transmission device 1. In other words, the optical transmission device may be an optical signal encryption device that is inputted with a carrier wave and transmits a cryptographic signal. Furthermore, the optical signal encryption device may be something that is inputted with an optical signal which is a carrier wave on which transmission data is already placed, and performs multi-level modulation for encryption.

The cryptographic signal transmission unit 15 performs processing such as amplifying the intensity of the cryptographic signal as needed, but configuration may be taken to not incorporate the cryptographic signal transmission unit 15 in the optical transmission device 1, have the optical transmission device 1 output cryptographic data without amplification, and use an external optical signal amplification device (not illustrated).

Each signal in a circuit diagram may be amplified or attenuated in accordance with a signal intensity converter, such as a signal amplifier, as necessary. For example, an electrical signal outputted from a DAC such as a coarse DAC and a fine DAC may be amplified to a signal intensity in accordance with the specification of a phase modulation element.

For example, in the embodiments described above, for the convenience of the description, fine phase modulation is performed on an optical signal that had been subjected to coarse phase modulation, but there is no particular limitation to this. In other words, the coarse modulation and the fine modulation may be performed in any order. Furthermore, the coarse modulation and the fine modulation may be performed on any path of an interferometer configuration that branches into any number of paths, and the modulated signal may be subject to interference any number of times at any location.

In addition, a signal in accordance with signal processing in the above examples of the present invention is given as an optical signal, but there is no limitation to this. In other words, there is no limitation to an optical signal, and it may be a signal that enables transmission of data after performing various kinds of modulation on an electrical signal or the like.

To summarize the above, it is sufficient if a signal processing device to which the present invention is applied is as follows, and various embodiments can be taken. In other words, a signal processing device to which the present invention is applied comprises:

a first modulation element (for example, the coarse phase modulation element 62A of FIG. 8) that modulates a signal to any one of M1 (M1 is any integer) patterns (for example, a pattern of arrangement positions for respective symbols) in a first range (for example, the range VP1 in FIG. 7);

(k−1) (k is an integer that is greater than or equal to 1) second modulation elements (for example, the fine phase modulation elements 62B-1 through 62B-(k−1) of FIG. 8) that respectively modulate the signal to any one of M2 through Mk (M2 through Mk are arbitrary integers that are mutually independent of each other and M1) respective patterns in a second range (for example, the range VP2 in FIG. 7) through a kth range, respectively; and a control unit (for example, the coarse DAC 61A and the fine DACs 61B-1 through 61B-(k−1) in FIG. 8) that controls the first range for the first modulation element and the respective second range through the kth range for the (k−1) second modulation elements, wherein the control unit performs control to make the respective second range through the kth range for the (k−1) second modulation elements narrower than the first range for the first modulation element. By employing this signal processing device, it is possible to improve modulation resolution.

EXPLANATION OF REFERENCE NUMERALS

1 . . . optical transmission device, 2 . . . optical reception device, 3 . . . optical communication cable, 11 . . . transmission data provision unit, 12 . . . cryptographic key provision unit, 13 . . . encryption unit, 14 . . . carrier wave generation unit, 15 . . . cryptographic signal transmission unit, 21 . . . cryptographic signal reception unit, 22 . . . cryptographic key provision unit, 23 . . . decryption unit, 31 . . . cryptographic generation unit, 32 . . . multi-level modulation unit, 41 . . . DAC, 42 . . . phase modulation element, L1 . . . signal path, L2 . . . signal path, L3 . . . signal path, L4 . . . signal path, MZ1 . . . Mach-Zehnder modulator, 51 . . . DAC, 52 . . . phase modulation element, 53 . . . DAC, 54 . . . phase modulation element, L11 . . . signal path, L12 . . . signal path, L21 . . . signal path, L22 . . . signal path, L23 . . . signal path, 61A . . . coarse DAC, 61B . . . fine DAC, 62A . . . coarse phase modulation element, 62B . . . fine phase modulation element, L31 . . . signal path, L32 . . . signal path, L33 . . . signal path, L34 . . . signal path, 61A . . . coarse DAC, 61B-1 . . . fine DAC, 61B-k−1 . . . fine DAC, 62A . . . coarse phase modulation element, 62B-1 . . . fine phase modulation element, 62B-k−1 . . . fine phase modulation element, MZ2 . . . Mach-Zehnder modulator, 70 . . . DAC, 71 . . . phase modulation element, 72A . . . coarse phase modulation element, 72B . . . fine phase modulation element, IQ1 . . . IQ modulator, 80Aa, 80Ab . . . coarse DAC, 80B . . . fine DAC, 81Aa,81Ab . . . coarse phase modulation element, 81B . . . fine phase modulation element, MZ3 . . . Mach-Zehnder modulator, 90 . . . DAC, 91 . . . phase modulation element, 100A . . . coarse DAC, 100B . . . fine DAC, 101A . . . coarse phase modulation element, 101B . . . fine phase modulation element, 101Bp . . . fine phase modulation element, IQ2 . . . IQ modulator, 120Aa,120Ab . . . coarse DAC, 120Ba,120Bb . . . fine DAC, 121Aa,121Ba . . . fine phase modulation element, 121Ab,121Bb . . . fine phase modulation element, 121Bap . . . fine phase modulation element, 121Bbp . . . fine phase modulation element

The invention claimed is:

1. A signal processing device, comprising:
a first modulation element that modulates a signal to any one of M1 (M1 is an arbitrary integer) patterns in a first range;
(k−1) (k is an integer that is greater than or equal to 2) second modulation elements that respectively modulate the signal to any one of M2 through Mk (M2 through Mk are arbitrary integers that are mutually independent of each other and M1) respective patterns in a second range through a kth range, respectively; and
a control unit that controls the first range for the first modulation element and the respective second range through the kth range for the (k−1) second modulation elements,
wherein the control unit performs control to make the respective second range through the kth range for the (k−1) second modulation elements narrower than the first range for the first modulation element.

2. The signal processing device according to claim 1, wherein
the first modulation element and the second modulation elements are elements that cause the phase of the signal to rotate,
a phase rotation amount (peak-to-peak) that represents the first range for the first modulation element is represented by:

$$\frac{2\pi}{M_1} \times (M_1 - 1)$$

and the ratio of a phase rotation amount (peak-to-peak) representing an nth (n is any value from 2 through k) range for the nth second modulation element with respect to the phase rotation amount (peak-to-peak) for the first modulation element is represented by:

$$\frac{1}{M_1 - 1} \times \frac{1}{\prod_{i=2}^{n-1} M_i} \times \left(1 - \frac{1}{M_n}\right).$$

3. The signal processing device according to claim 1, wherein
the first modulation element and the second modulation elements are elements for causing the phase of the signal to rotate, and form an interferometer configuration for performing amplitude modulation, and
the ratio of a modulation amplitude (peak-to-peak) representing an nth (n is any value from 2 through k) range for the nth second modulation element with respect to a modulation amplitude (peak-to-peak) representing a first range for the first modulation element is represented by:

$$\frac{1}{M_1-1} \times \frac{1}{\prod_{i=2}^{n-1} M_i} \times \left(1-\frac{1}{M_n}\right).$$

4. The signal processing device according to claim 1, wherein
the control unit performs control to turn the signal into a cryptographic signal.

\* \* \* \* \*